(12) United States Patent
Jamshidi

(10) Patent No.: US 10,970,294 B2
(45) Date of Patent: Apr. 6, 2021

(54) WEBSITE SCORING SYSTEM

(71) Applicant: Siteimprove A/S, Copenhagen (DK)

(72) Inventor: Kamran Jamshidi, Bloomington, MN (US)

(73) Assignee: Siteimprove A/S

( * ) Notice: Subject to any disclaimer, the term of this patent is extended or adjusted under 35 U.S.C. 154(b) by 0 days.

(21) Appl. No.: 16/866,219

(22) Filed: May 4, 2020

(65) Prior Publication Data
US 2020/0394200 A1   Dec. 17, 2020

Related U.S. Application Data

(63) Continuation of application No. 16/742,553, filed on Jan. 14, 2020, now Pat. No. 10,860,594, which is a
(Continued)

(51) Int. Cl.
*G06F 16/2457* (2019.01)
*G06F 16/958* (2019.01)
(Continued)

(52) U.S. Cl.
CPC ...... *G06F 16/24578* (2019.01); *G06F 16/951* (2019.01); *G06F 16/958* (2019.01); *G06F 16/9535* (2019.01); *G06F 16/986* (2019.01)

(58) Field of Classification Search
CPC ........ G06F 11/36; G06Q 30/02; G06Q 30/06; G06Q 10/06
See application file for complete search history.

(56) References Cited

U.S. PATENT DOCUMENTS 6,360,235 B1   3/2002 Tilt
9,087,035 B1 *  7/2015 Bandaru ............... G06F 16/958
(Continued)

FOREIGN PATENT DOCUMENTS

WO   WO 2012/027022   3/2012

OTHER PUBLICATIONS

Evaluating Websites Using a Practical Quality Model written by Zihou Zhou, (hereafter Zhou), 2009 (Year: 2009).*
(Continued)

*Primary Examiner* — Hau H Hoang
(74) *Attorney, Agent, or Firm* — Fish & Richardson P.C.

(57) ABSTRACT

In one implementation, a method for providing a user with an assessment of website quality includes receiving, at a computer system, identification of a website; retrieving, by the computer system, content that comprises the website; and automatically analyzing, by the computer system, the content. The method can further include determining, by the computer system, (i) a search engine optimization (SEO) sub-score for the website, (ii) an accessibility sub-score for the website, and (iii) a quality assurance score for the website based on the analysis of the content. The method can additionally include determining, by the computer system, a quality score for the website based on a combination of the SEO sub-score, the accessibility sub-score, and the quality assurance sub-score; and transmitting, by the computer system, the quality score to a client computing device for presentation in a user interface.

24 Claims, 38 Drawing Sheets

Related U.S. Application Data continuation of application No. 16/124,145, filed on Sep. 6, 2018.

(60) Provisional application No. 62/570,653, filed on Oct. 10, 2017, provisional application No. 62/555,015, filed on Sep. 6, 2017.

(51) Int. Cl.
*G06F 16/9535* (2019.01)
*G06F 16/951* (2019.01)

(56) References Cited

U.S. PATENT DOCUMENTS

| | | | |
|---|---|---|---|
| 9,537,732 | B2 | 1/2017 | Mukherjee et al. |
| 2004/0039734 | A1 | 2/2004 | Judd et al. |
| 2006/0253345 | A1 | 11/2006 | Herber |
| 2008/0133500 | A1 | 6/2008 | Edwards |
| 2009/0113287 | A1 | 4/2009 | Yee |
| 2010/0042608 | A1 | 2/2010 | Kane |
| 2012/0010927 | A1 | 1/2012 | Attenberg et al. |
| 2012/0017281 | A1 | 1/2012 | Bannerjee et al. |
| 2012/0047120 | A1 | 2/2012 | Connolly |
| 2012/0254405 | A1 | 10/2012 | Ganesh et al. |
| 2012/0254723 | A1 | 10/2012 | Kasa et al. |
| 2013/0282691 | A1 | 10/2013 | Stouffer et al. |
| 2014/0164345 | A1 | 6/2014 | Connolly et al. |
| 2014/0304578 | A1 | 10/2014 | Parkinson et al. |
| 2015/0039746 | A1 | 2/2015 | Mukherjee et al. |
| 2015/0317132 | A1 | 11/2015 | Rempell et al. |
| 2015/0348071 | A1 | 12/2015 | Cochrane et al. |
| 2016/0055490 | A1 | 2/2016 | Keren et al. |
| 2016/0210360 | A9 | 7/2016 | Stouffer et al. |
| 2016/0353148 | A1 | 12/2016 | Prins et al. |
| 2018/0210965 | A1 | 7/2018 | Grigoryan et al. |
| 2020/0151187 | A1 | 5/2020 | Jamshidi |

OTHER PUBLICATIONS

How to code a responsive circular percentage chart with SVG and CSS (https://medium.com/@pppped/how-to-code-a-responsive-circular-percentage-chart-with-svg-and-css-3632f8cd7705), Sergio Pedercini May 17, 2017 (Year: 2017).*

International Preliminary Report on Patentability in PCT Appln. No. PCT/US2018/049809, dated Mar. 10, 2020, 14 pages.

International Search Report and Written Opinion in Application No. PCT/US2018/049809, dated Nov. 19, 2018, 13 pages.

Kamal, "Evaluating web accessibility metrics for Jordanian Universities," International Journal of Advanced Computer Science and Applications, 2016, 7(7):113-122.

Silktide.com [online], "Silktide," available on or before Feb. 8, 2017, via Internet Archive: Wayback Machine URL <https://web.archive.org/web/20170208112649/https://silktide.com/>, retrieved on May 7, 2020, URL<http://www.silktide.comt>, 2 pages.

Sitebeam.net [online], "Sitebeam," available on or before Feb. 4, 2017, via Internet Archive: Wayback Machine URL <https://web.archive.org/web/20170204162753/http://sitebeam.net/>, retrieved on May 7, 2020, URL<http://www.sitebeam.net>, 4 pages.

EP Supplementary Search Report in European Application No. EP18853482, dated Mar. 29, 2020, 9 pages.

* cited by examiner

FIG. 10A

Siteimprove.com - 2017 Website
https://siteimprove.com

Dashboard / DCI Overview

DCI Overview

Accessibility — Score details — 87.9/100 — 1004
Quality Assurance — 95.7/100 — 1006
SEO — 74.4/100 — 1008

Overall score — DCI 86.0/100 +86.0 — 1002

Score breakdown

Fix These Issues to Improve Your Score — 1056

| Issues | Category | Points you can gain |
|---|---|---|
| Pages at level 3 and above with multiple Level A/AA errors | Accessibility | 1.71 points |
| Mixed HTTPS content | SEO | 1.36 points |
| GZIP Compression | SEO | 1.20 points |
| Pages at level 2 with multiple Level A/AA errors | Accessibility | 1.02 points |
| Mobile speed | SEO | 0.87 points |
| Touchscreen-readiness | SEO | 0.83 points |
| Duplicate meta titles | SEO | 0.63 points |
| Pages at level 3 and above with broken links | Quality Assurance | 0.56 points |
| Pages with low text-to-code ratio | SEO | 0.51 points |
| Redirect chains | SEO | 0.34 points |

FIG. 10B

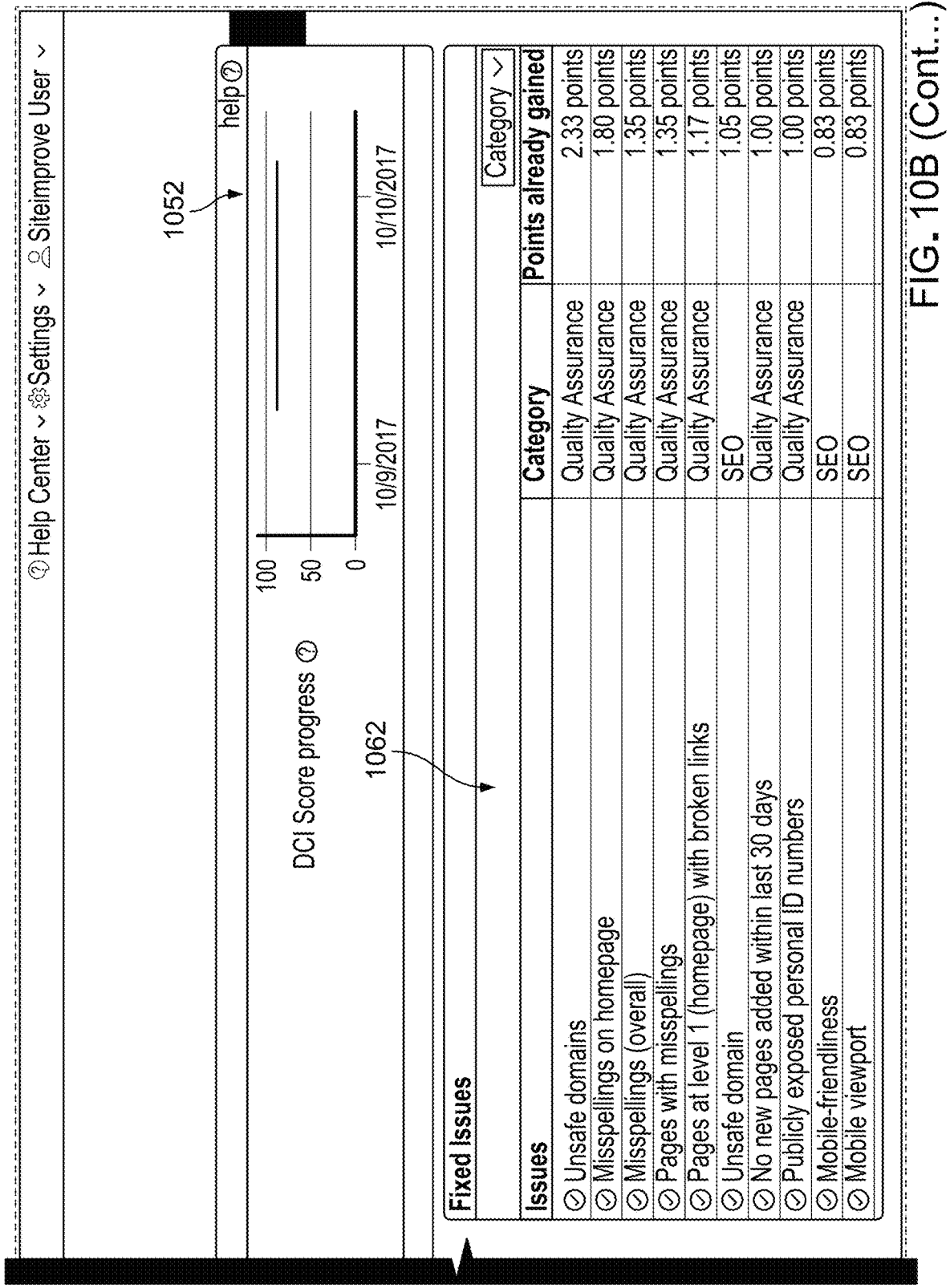
FIG. 10B (Cont...)

Siteimprove.com - 2017 Website
https://siteimprove.com

SEO Overview

| | Score details ⓘ | | |
|---|---|---|---|
| Technical ⓘ | 71.5/100 | ← 1104 | |
| Content ⓘ | 75.1/100 | ← 1106 | |
| User Experience ⓘ | 85.5/100 | ← 1108 | Overall score ⓘ  SEO 74.4/100 +74.4 ← 1008 |
| Mobile ⓘ | 74.5/100 | ← 1110 | |

Score breakdown

Fix These Issues to Improve Your Score

| Issues | Difficulty ⓘ | Points you can gain |
|---|---|---|
| ⓘ 1,471 pages with mixed HTTPS content | ○○○○ | 4.08 points |
| ⓘ GZIP Compression | ○○○○ | 3.60 points |
| ⓘ Mobile speed | ○○○○ | 2.60 points |
| ⓘ Touchscreen-readiness | | 2.50 points |
| ⓘ 267 duplicate meta titles | ○ | 1.90 points |

See all issues

Last completed crawl: 10/7/2017    Next completed crawl sheduled for: 10/12/2017

FIG. 11A

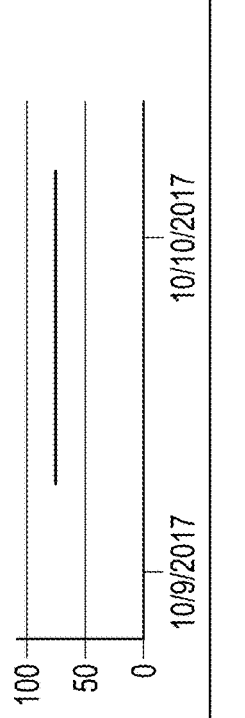

1130

Siteimprove | Help Center ⌄ | Settings ⌄ | Siteimprove User ⌄

Siteimprove.com - 2017 Website ⌄
https://siteimprove.com

SEO Overview
SEO Score Breakdown ← 1132

Score Breakdown

| Issues | Score |
|---|---|
| | export |
| SEO ⓘ  1134 → | 74.4 |
| Content ⓘ | 75.1/100 |
| Meta Content ⓘ | 79.4/100 |
| Meta Descriptions ⓘ | 75.1/100 |
| Empty meta descriptions | 7.8/100 |
| Missing meta descriptions | 99.1/100 |
| Meta descriptions are too long | 99.8/100 |
| Meta descriptions are too short | 93.6/100 |
| Meta Titles ⓘ | 80.5/100 |
| Empty meta titles | 100/100 |

FIG. 11B

| | |
|---|---|
| Meta titles are too long | 100/100 |
| Missing meta titles | 68.6/100 |
| Meta titles are too short | 53.5/100 |
| Meta Content Uniqueness ⑦ | 69.8/100 |
| Duplicate meta descriptions | 90.3/100 |
| Duplicate meta titles | 49.2/10 |
| Content Quality ⑦ | 76.6/10 |
| Readability (Flesch-kincaid Reading Ease) ⑦ | 9.2/10 |
| Difficult-to-read pages (Flesch-kincaid Reading Ease) | 6.8/10 |
| Sentences are too long | 11.6/10 |
| Content Freshness ⑦ | 100/100 |
| Pages created within last 30days | 100/100 |
| Pages not updated within last year | 100/100 |
| Media files not updated within last year | 100/100 |
| Links ⑦ | 99.7/100 |
| Internal broken links ⑦ | 99.5/100 |
| Broken links on homepage | 100/100 |

FIG. 11B (Cont.)

Siteimprove.com - 2017 Website
https://siteimprove.com

Quality Assurance Overview

Score details

| | | |
|---|---|---|
| Content Quality | 90.7 /100 | ← 1204 |
| Content Freshness | 99.3 /100 | ← 1206 |
| Security | 100 /100 | ← 1208 |
| User Experience | 95.9 /100 | ← 1210 |

1202

Overall score

QA
95.7/100
+95.7

← 1004

Score breakdown

Fix These Issues to Improve Your Score

| Issue | Points you can gain |
|---|---|
| ① Pages at level 3 and above with broken links | 1.68 points |
| ① Pages that are difficult to read | 0.84 points |
| ① Pages at level 2 with broken links | 0.72 points |
| ① Pages with long sentences | 0.56 points |
| ① Broken links (overall) | 0.44 points |

See all issues

Last completed crawl: 10/7/2017    Next completed crawl scheduled for: 10/12/2017

FIG. 12A

| Issues | | 1254 | Score |
|---|---|---|---|
| Quality Assurance ⓘ | | | 95.7 |
| Content Quality ⓘ | | | 90.7/100 |
| Misspellings ⓘ | | | 100/100 |
| | Misspellings on homepage | | 100/100 |
| | Pages with misspellings | | 100/100 |
| | Misspellings (overall) | | 100/100 |
| Readability ⓘ | | | 6.8/100 |
| | Pages that are difficult to read | | 6.8/100 |
| | Pages with long sentences | | 6.8/100 |
| Content Freshness ⓘ | | | 99.3/100 |

FIG. 12B

| | |
|---|---|
| No new pages added within last 30 days | 100/100 |
| Media files in need of updating | 99.5/100 |
| Documents in need of updating | 97.7/100 |
| Security ⑦ | 100/100 |
| Publicity exposed personal ID numbers | 100/100 |
| Unsafe domains | 100/100 |
| User Experience ⑦ | 95.9/100 |
| Broken Links ⑦ | 98.2/100 |
| Broken links (overall) | 98.2/100 |
| Document Usability ⑦ | 100/100 |
| Non-PDF documents | 100/100 |
| Pages with Word, Powerpoint, Exel, or XML documents | 100/100 |
| Image Size ⑦ | 99.6/100 |
| Image larger than 1MB | 99.8/100 |
| Pages with images larger than 1MB | 99.3/100 |
| Pages with Broken Links ⑦ | 93.1/100 |
| Pages at level 1 (homepage) with broken links | 100/100 |
| Pages at level 3 and above with broken links | 92/100 |
| Pages at level 2 with broken links | 93.1/100 |

FIG. 12B (Cont.)

Sitelmprove.com - 2017 Website
https://siteimprove.com

Accessibility Overview

Score details ⑦

| | | |
|---|---|---|
| Level A Errors ⑦ | 97.2 /100 | ← 1304 |
| Level AA Errors ⑦ | 98.8 /100 | ← 1306 |
| Warnings (all WCAG levels) ⑦ | 78.7 /100 | ← 1308 |
| Pages with multiple Level A/AA errors ⑦ | 69.5 /100 | ← 1310 |

1302

Overall score ⑦

Accessibility
87.9/100
+87.9
← 1006

🗄 Score breakdown

Conformance & Severity Explanation
○ Level A ⑦  ○ Level AA ⑦  ○ Level AAA ⑦  ① Errors ⑦

All issues ← 1312   ✎ Editor   1316

Fix These Issues to Improve Your Score

| Issue | Points you can gain |
|---|---|
| ① Pages at level 3 and above with multiple Level A/AA errors | 5.13 points |
| ① Pages at level 2 with multiple Level A/AA errors | 3.05 points |
| ① Pages at level 1 (homepage) with multiple Level A/AA errors | 0.96 points |
| ① HTML Validation | 0.82 points |
| ① iFrame is missing a description | 0.41 points |

See all issues

Last completed crawl: 10/7/2017    Next completed crawl scheduled for: 10/12/2017

| Issue | 1354 Score |
|---|---|
| Accessibility ⓘ | 87.9 |
| Web Content Accessibility Guidelines (WCAG) 2.0 ⓘ | 87.9/100 |
| Errors (all WCAG levels) ⓘ | 96.7/100 |
| Level A Errors ⓘ | 97.2/100 |
| Image with no alt attribute | 99.8/100 |
| "Aria-labelledby" has incorrect (ID) reference | 100/100 |
| WAI-ARIA image is missing alternative text | 100/100 |
| Page element has no description | 100/100 |
| Image map without reference | 100/100 |
| Alternative text for image is identical to link text | 100/100 |

FIG. 13B

| | |
|---|---|
| Alternative text for image is a file name | 99.4/100 |
| "Area" element is missing alternative text | 100/100 |
| "Longdesc" attribute does not link existing resource | 100/100 |
| The image does not have the correct alternative | 100/100 |
| Image button has no description | 100/100 |
| Adjacent links used for same destination | 99.6/100 |
| Page element has no description | 100/100 |
| "Aria-describedby" has incorrect (ID) reference | 100/100 |
| "Aria-labelledby" has incorrect (ID) reference | 100/100 |
| Generic landmarks are not named | 99.9/100 |
| WAI-ARIA group is missing a name | 100/100 |
| Heading is missing text | 99.8/100 |
| Form elements are not grouped | 96.9/100 |
| "Font" tag used to format text | 100/100 |
| "Marquee" tag is used | 100/100 |
| Reference to non-existent image map | 100/100 |
| "Bold" tag used to format text | 100/100 |
| Element ID is not unique | 100/100 |
| Element ID is not unique | 100/100 |

FIG. 13B (Cont.)

QA Health Score ← 1464
- Content Quality (.35)
    - Misspellings (.65)
        - % of total words that are not misspellings (.3)
        - % of total pages with 0 misspelling (.3)
        - 0 misspellings on homepage (.4)
    - Potential Misspellings (.25)
        - % of total words that are not potential misspellings (.3)
        - % of total pages with 0 potential misspellings (.3)
        - 0 potential misspellings on homepage (.4)
    - Readability (.1)
        - ARI
            - % of total pages with a readability score of 9 or less (.6)
            - % of total pages with 0 long sentences (.4)
        - LIX
            - % of total pages with a readability score of 30 or less (.6)
            - % of total pages with 0 long sentences (.4)
        - Coleman-Liau, Flesch-Kincaid Grade Level, Gunning Fog, SMOG
            - % of total pages with a readability score of 8 or less (.6)
            - % of total pages with 0 long sentences (.4)
        - Flesch-Kincaid Reading Ease
            - % of total pages with a readability score of 70 or higher (.6)
            - % of total pages with 0 long sentences (.4)
- Freshness (.1)
    - Greater than/equal to 1 page first detected within the last 30 days (.6)
    - % of total documents last modified within the last 3 years (.3)
    - % of total media files last modified within the last 3 years (.1)
- User Experience (.45)
    - Broken Links (.8)
        - % of total links that are not broken (.3)
        - % of total pages with 0 broken links (.3)
        - 0 misspellings on homepage (.4)
    - Image Size (1)
        - % of total images that are less than/equal to 1 MB (.5)
        - % of total pages with 0 images that are greater than 1 MB (.5)
    - Document Type (1)
        - % of total documents that are PDFs (.5)
        - % of total pages with 0 word, PowerPoint, Exel, or XML documents (.5)
- Security (.1)
    - 0 unsafe domains (.7)
    - 0 personal ID numbers (.3)

FIG. 14B (Cont.)

WEBSITE SCORING SYSTEM

CROSS-REFERENCE TO RELATED APPLICATIONS

This application is a continuation of U.S. patent application Ser. No. 16/742,553 filed Jan. 14, 2020, which is a continuation of U.S. patent application Ser. No. 16/124,145, which is entitled WEBSITE SCORING SYSTEM and was filed on Sep. 6, 2018, which claims the benefit of priority to U.S. Provisional Application Ser. No. 62/555,015, which is entitled WEBSITE SCORING SYSTEM and was filed on Sep. 6, 2017, and to U.S. Provisional Application Ser. No. 62/570,653, which is entitled WEBSITE SCORING SYSTEM and was filed on Oct. 10, 2017, the contents of which are hereby incorporated by reference.

BACKGROUND

Websites can vary in their quality. The quality of a website can affect the user experience of users who visit the website. For example, websites with broken links, misspellings, and other features that do not function as intended can be frustrating for users visiting a site.

Additionally, websites that are not optimized for search engines (also referred to as "search engine optimization" or SEO) may have a low level of quality because users may not be able to locate relevant pages on the website (or locate the website more generally) using a search engine. For example, websites that do not have information formatted properly for search engines to retrieve and associate with other information on the page may have low levels of SEO, which may result in those websites not appearing as prominently in search results as they otherwise should for relevant search strings.

Websites can also have a low level of quality if they are not readily accessible to all users regardless of impairment (also referred to as "website accessibility"). For example, if a website is not formatted properly, users who are seeing or hearing impaired may not be able to use website reader applications to review and navigate through the content.

SUMMARY

This document generally describes systems, devices, computer program products, and techniques to allow for efficiently, consistently, and accurately determining, or scoring, the quality of websites. The quality issues noted above can pose significant challenges for website owners, operators, and designers. For example, it can be difficult enough to assess quality when websites have static content that changes infrequently, but it can become a nearly impossible task to readily assess with dynamic content (e.g., incorporating user-generated content, incorporating frequent content updates) and large volumes of content. The technology described in this document permits website owners, operators, designers, and others to readily and efficiently assess website quality across a standardized metric (a scoring scale) that quantifies website quality, identifies reasons for the resulting score (e.g., broken links, features to improve for SEO, low accessibility), and that permits real time feedback as website updates/changes are made so that website owners/operators can quickly address and correct issues.

In one implementation, a method for providing a user with an assessment of website quality includes receiving, at a computer system, identification of a website; retrieving, by the computer system, content that comprises the website; and automatically analyzing, by the computer system, the content. The method can further include determining, by the computer system, (i) a search engine optimization (SEO) sub-score for the website, (ii) an accessibility sub-score for the website, and (iii) a quality assurance score for the website based on the analysis of the content. The method can additionally include determining, by the computer system, a quality score for the website based on a combination of the SEO sub-score, the accessibility sub-score, and the quality assurance sub-score; and transmitting, by the computer system, the quality score to a client computing device for presentation in a user interface.

The method can optionally include one or more of the following features. The SEO sub-score can be determined based on a combination of a technical SEO sub-score that represents how well technical website elements comprising the particular website are able to be accessed, crawled, and indexed by search engines; a content SEO sub-score that represents a quality of the particular website's user-facing content and how closely metadata for the particular website aligns with the user-facing content; a user experience SEO sub-score that represents how effectively embedded information is used to enhance the user experience; and a mobile SEO sub-score that represents how responsive or adaptable the particular website is to being used and displayed on a mobile device. The accessibility sub-score can be determined based on a combination of: a level A accessibility sub-score that represents to a prevalence of level A errors under Web Content Accessibility Guidelines (WCAG); a level AA accessibility sub-score that represents to a prevalence of level AA errors under the WCAG; a warning accessibility sub-score that represents to warnings for all levels under the WCAG; and a multiple error sub-score that represents to pages on the particular website that include multiple level A or AA errors under the WCAG. The QA sub-score can be determined based on a combination of: a content quality QA sub-score that represents to a level of editorial quality for the particular website that affects how quickly and accurately users are able to comprehend content on the particular website; a content freshness QA sub-score that represents how up-to-date the content on the particular website is; a user experience QA sub-score that represents how well a user can navigate the particular website; and a security QA sub-score that represents how well the particular website maintains user privacy and avoids linking to unsafe domains.

In another implementation, a system for generating comprehensive scores assessing website quality based on automated analysis of websites includes a website scoring server system to generate website quality scores for websites. The website scoring server system can be configured to: identify a particular website to evaluate; retrieve code for webpages that comprise the particular website from one or more web server systems that host the particular website; locally execute and interpret the code to render the webpages as they would appear on a client computing device; retrieve a set of conditions to evaluate across the webpages for the particular website; generate base level quality scores for the particular website based on evaluation the set of conditions across the webpages for the particular website, the evaluation of the set of conditions including determining whether and to what extent the set of conditions are present across the webpages; retrieve a hierarchy of quality scores and weightings for combining the base level quality scores to generate; generate a comprehensive quality score for the particular website by combining the base level quality scores for the particular website according to the hierarchy of quality scores and the weightings, wherein generating the comprehensive quality score includes generating intermediate quality scores for the particular website; store the comprehensive quality score and at least a portion of the intermediate quality scores for the particular website; and transmit the comprehensive quality score and at least the portion of the intermediate quality scores for the particular website to a client computing device. The system can further include a client computing device to provide a graphical user interface (GUI) to present information on website quality as determined by the website scoring server system. The client computing device can be configured to: receive the comprehensive quality score and at least the portion of the intermediate quality scores from the website server system; output the GUI on a display of the client computing device; and present a first graphical element in the GUI that corresponds to the comprehensive quality score for the particular website and one or more second graphical elements in the GUI that correspond to at least the portion of the intermediate quality scores.

The system can optionally include one or more of the following features. The base level quality scores can include float values and Boolean values. The float values can be determined based on a proportion of the particular website that satisfy corresponding float conditions from the set of conditions. The Boolean values can be determined based on whether the particular websites satisfies corresponding Boolean conditions from the set of conditions. The float values can range from 0.0 to 1.0 and the Boolean values can be either 0 or 1. The float and Boolean values can be combined according to the hierarchy of quality scores and the weighting to generate the intermediate scores. Rendering the webpages as they would appear on a client computing device can include generating a plurality of DOM trees for the webpages, the float values are determined by identifying a proportion of the DOM trees that satisfy the corresponding float conditions, and the Boolean values are determined by determining whether the DOM trees satisfy the corresponding Boolean conditions. The proportion of the particular website that satisfy the corresponding float conditions can include a percentage of the webpages for the particular website that satisfy the corresponding float conditions. The proportion of the particular website that satisfy the corresponding float conditions can include a percentage of a particular type of website element on the webpages for the particular website that satisfy the corresponding float conditions. The particular type of website element can include words on the webpages for the particular website. The particular type of website element can include links on the webpages for the particular website.

The system can further include a database of website scores that stores a plurality of comprehensive website scores for a plurality of different websites, each of the plurality of comprehensive website scores being stored with a timestamp that corresponds to a time at which a corresponding website was retrieved and evaluated; and a repository of website code comprising code retrieved for the plurality of different websites, the repository of website code storing the code that was retrieved and evaluated to generate the plurality of comprehensive website scores. The website scoring server system can further be configured to: rank the plurality of different websites based on the corresponding plurality of comprehensive website scores; and generate and transmit a report based on the ranking. The website scoring server system can further be configured to: identify, based on the base level quality scores, fixes to be performed across the webpages for the particular website; determine, based on the base level quality scores, the hierarchy of quality scores, and the weightings, score improvement that correspond to amounts by which the comprehensive quality score will be improved by performing the fixes; and transmit the fixes and the corresponding score improvements for the fixes. The client computing device can further be configured to: receive the fixes and the corresponding score improvements for the fixes from the website scoring server system; and present the fixes and the corresponding score improvements for the fixes in the GUI.

The portion of the intermediate quality scores can include a search engine optimization (SEO) quality score for the particular website that is based on a plurality of SEO sub-scores, wherein the SEO sub-scores are generated based on a direct or indirect combination of a first portion of the base level quality scores; an accessibility quality score for the particular website that is based on a plurality of accessibility sub-scores, wherein the accessibility sub-scores are generated based on a direct or indirect combination of a second portion of the base level quality scores; and a quality assurance (QA) quality score for the particular website that is based on a plurality of QA sub-scores, wherein the QA sub-scores are generated based on a direct or indirect combination of a third portion of the base level quality scores. The SEO sub-scores can include a technical SEO sub-score that represents how well technical website elements comprising the particular website are able to be accessed, crawled, and indexed by search engines; a content SEO sub-score that represents a quality of the particular website's user-facing content and how closely metadata for the particular website aligns with the user-facing content; a user experience SEO sub-score that represents how effectively embedded information is used to enhance the user experience; and a mobile SEO sub-score that represents how responsive or adaptable the particular website is to being used and displayed on a mobile device. The accessibility sub-scores can include: a level A accessibility sub-score that represents to a prevalence of level A errors under Web Content Accessibility Guidelines (WCAG); a level AA accessibility sub-score that represents to a prevalence of level AA errors under the WCAG; a warning accessibility sub-score that represents to warnings for all levels under the WCAG; and a multiple error sub-score that represents to pages on the particular website that include multiple level A or AA errors under the WCAG. The QA sub-scores can include: a content quality QA sub-score that represents to a level of editorial quality for the particular website that affects how quickly and accurately users are able to comprehend content on the particular website; a content freshness QA sub-score that represents how up-to-date the content on the particular website is; a user experience QA sub-score that represents how well a user can navigate the particular website; and a security QA sub-score that represents how well the particular website maintains user privacy and avoids linking to unsafe domains.

In another implementation, a client computing device for providing a graphical user interface with graphical elements to present complex website scoring information includes: one or more processors; one or more storage devices to store instructions executable by the one or more processors, the instructions including instructions for an application that is programmed to request, obtain, and present website quality information provided by a website scoring system, the website scoring system being configured (i) to automatically analyze websites across one or more quality metrics, (ii) to generate website quality scores for the websites and fixes to resolve problems on the websites that, once fixed, will increase the website quality scores, and (iii) to transmit the quality scores to other computing devices for presentation; a network interface to communicate with a website scoring system via one or more communication networks; and a display to provide a graphical user interface (GUI) for the application, the GUI including the following: a first graphical element to visually represent the website quality scores; a second graphical element to textually represent the website quality scores; and selectable features that correspond to the fixes to resolve the problems on the websites, selection of the selectable features causing the display to present the problem on the websites and to indicate a fix to the problem.

Certain implementations may provide one or more advantages. For example, scores for websites can be determined in an efficient and consistent way. For instance, analyzing the quality of an entire website and its content across multiple different factors can use a large number of processor cycles. The technology described in this document permits for the number of processor cycles that are used to determine a website's score to be minimized, thus optimizing the processing efficiency of the score determination. Additionally, the efficiencies that are gained permit for real time website assessments and scores to be generated, which can allow website owners/operators to evaluate the current version of their sites, to respond more quickly to decreased quality, and to improve the user experience on the site. For instance, website owners can use the scores to manage their websites, such as to make changes on the website to improve their scores.

In another example, while website quality is a fairly subjective thing that can be difficult to assess and/or to compare across different web sites, the website scoring techniques and systems that are described throughout this document provide a standardized and objective way for website quality to be quantified. Such quantification can provide a variety of advantages, such as permitting the quality of a website to be readily compared and tracked over time, and/or permitting the quality of different websites to be readily compared to each other. Additionally, website quality can be comprehensively determined across an entire site and reduced to an easily understandable metric. Without such a metric, it would be difficult for a website owner to manage and improve upon a website, which may have multitudes of pages and content that are not able to be readily digested, analyzed, and improved upon without additional guidance.

In another example, graphical user interfaces (GUI) and specific GUI features can be provided to assist users in readily and quickly understanding a website's score, as well as the factors underlying the score and ways for a website owner to remedy any potential issues with the site. For example, graphical features can be presented to visually and textually identify website scores, components of those scores, and to provide points of comparisons for those scores to other scores, such as historical scores for the same website and/or scores for other websites. Such GUI features can permit for complex information to be presented in a simplified manner, permitting for it to be provided on a single screen that can readily be reproduced on a mobile computing device and/or other smaller form factor display.

In another example, information about specific website characteristics can be provided, including identifying characteristics that can be changed to improve the website's score. This can help owners and operators improve the website's quality and the user engagement/experience with the site. Additionally, by identifying features that can be improved, owners/operators can more efficiently improve the website and correct any potential issues.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE ATTACHMENTS

Figure 10A:
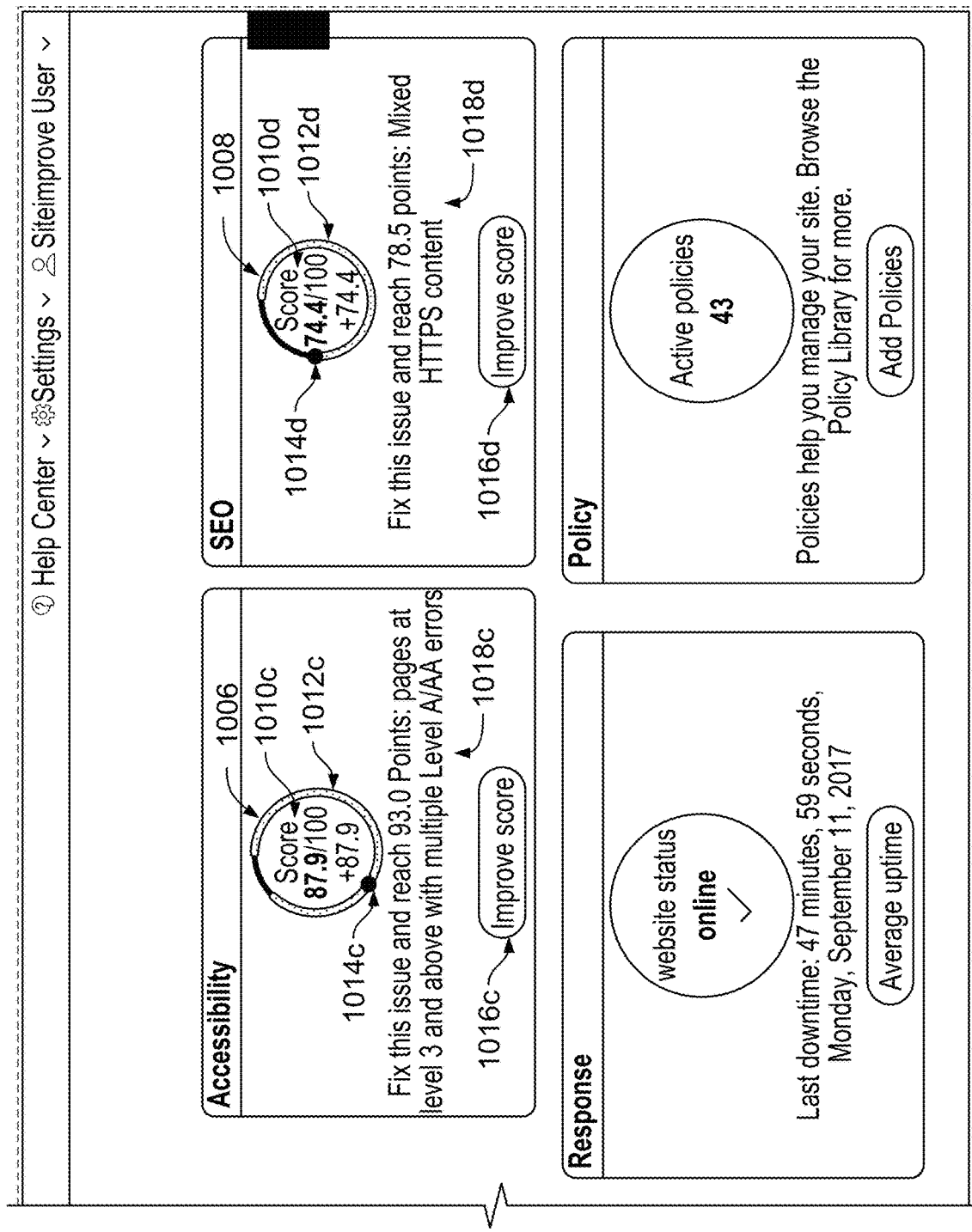

FIGS. 10A-B depict example user interfaces for presenting an example DCI score for a website.

Figure 11C:

FIGS. 11A-C depict example user interfaces for users to view SEO score information for a website.

Figure 12A:
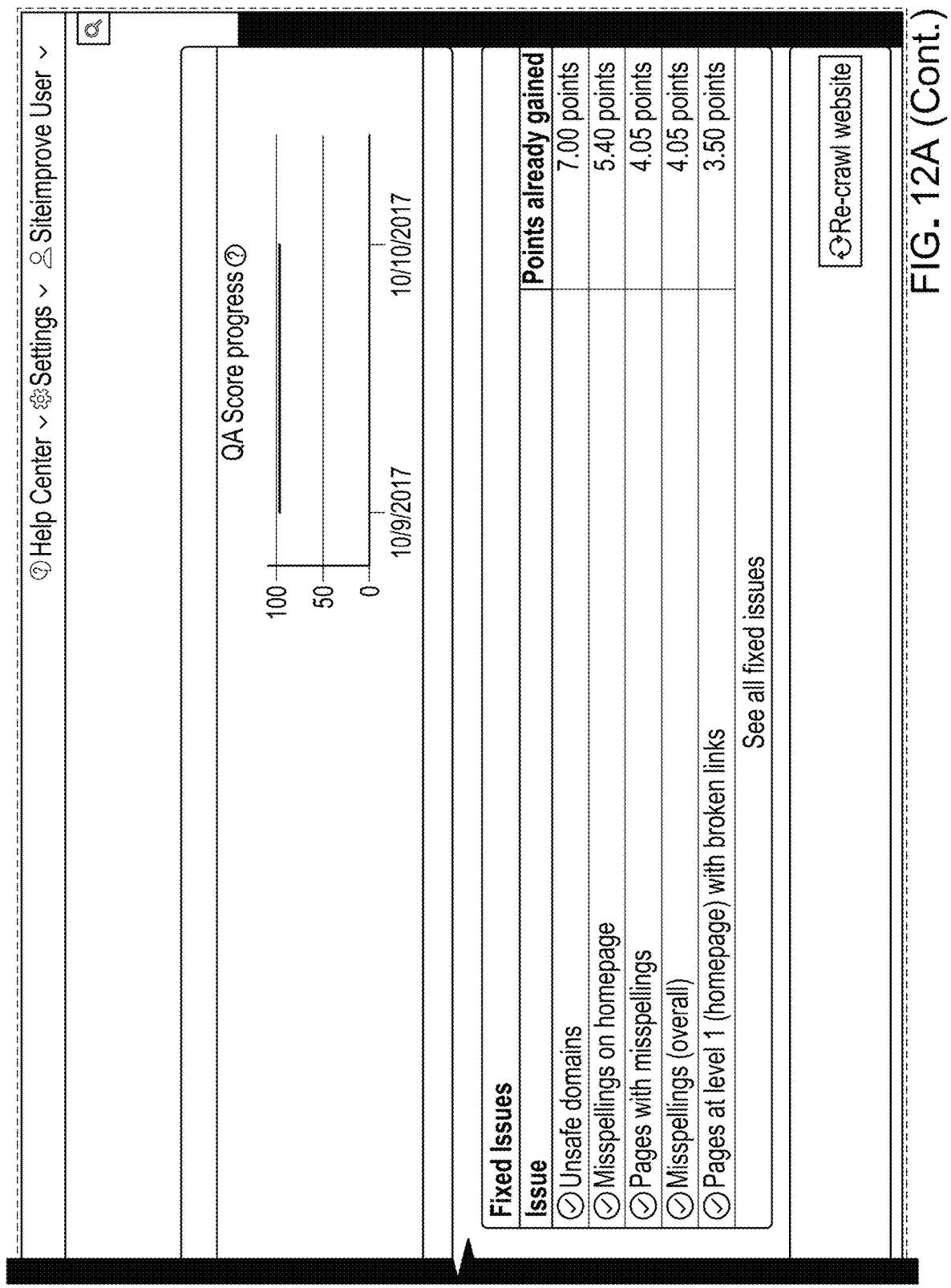

FIGS. 12A-B depict example user interfaces for users to view quality assurance score information for a website.

Figure 13A:
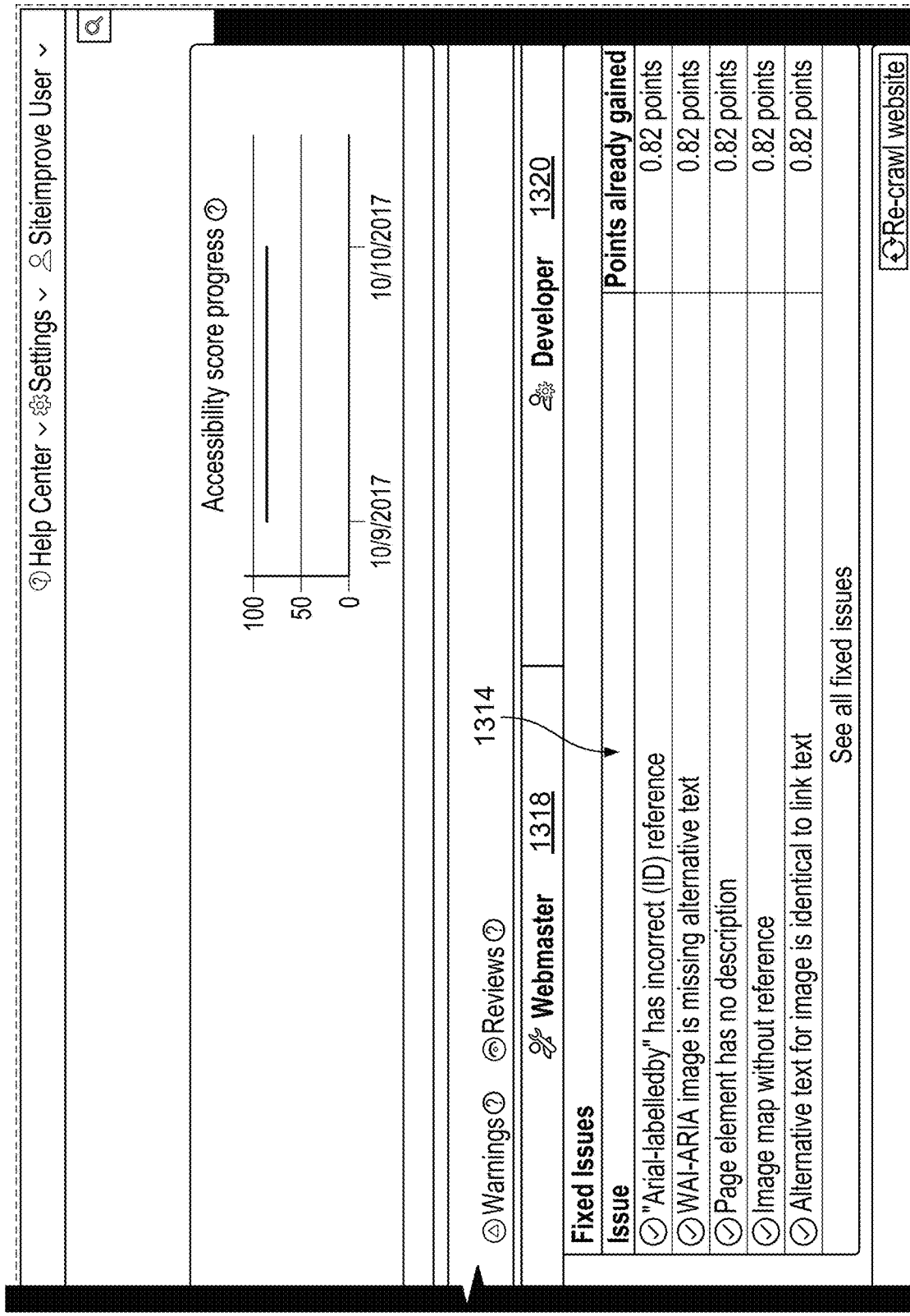

FIGS. 13A-B depict example user interfaces for users to view accessibility score information for a website.

Figure 14A:
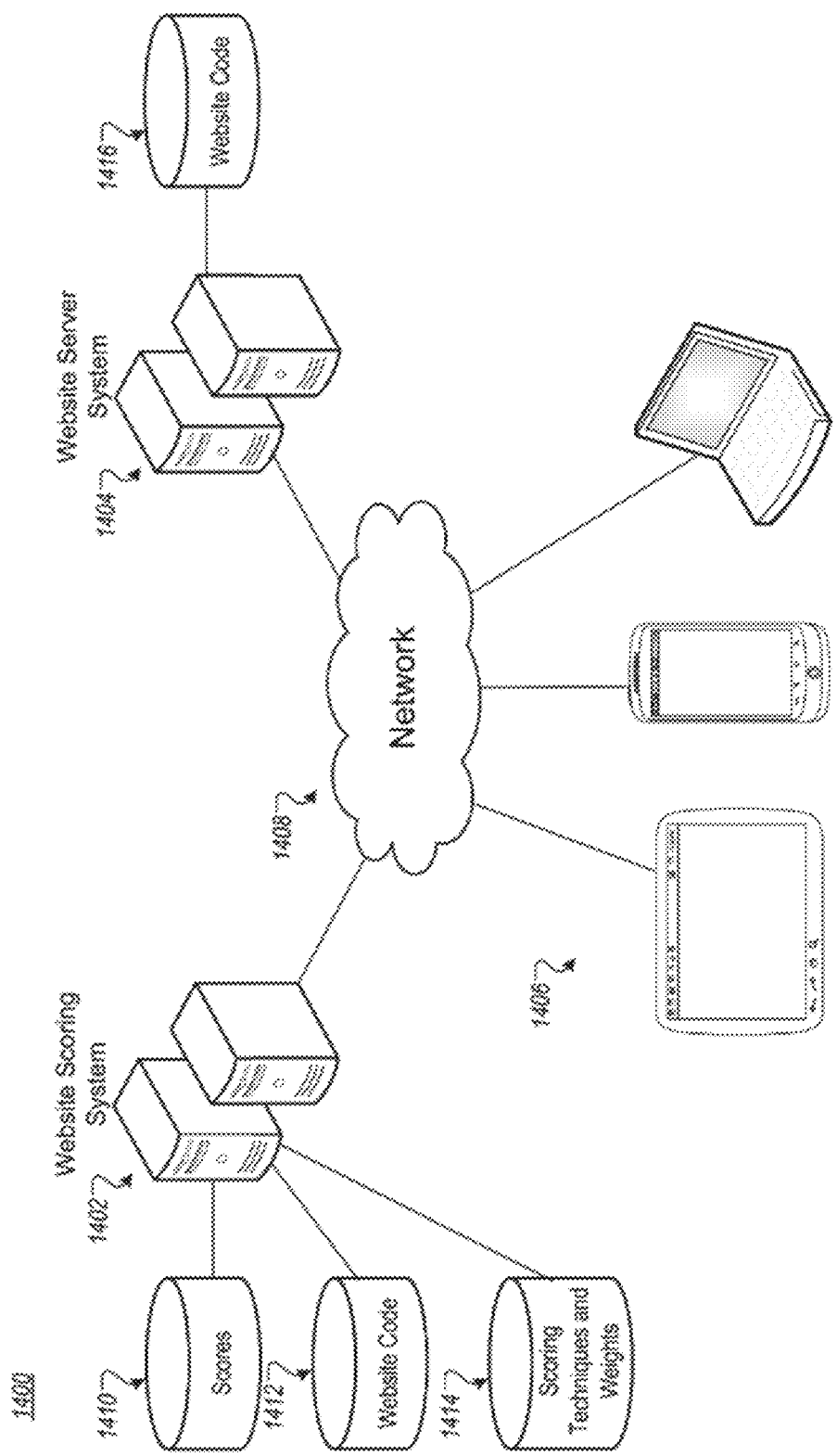

FIG. 14A is an example system for determining and providing website scores.

Figure 14B:
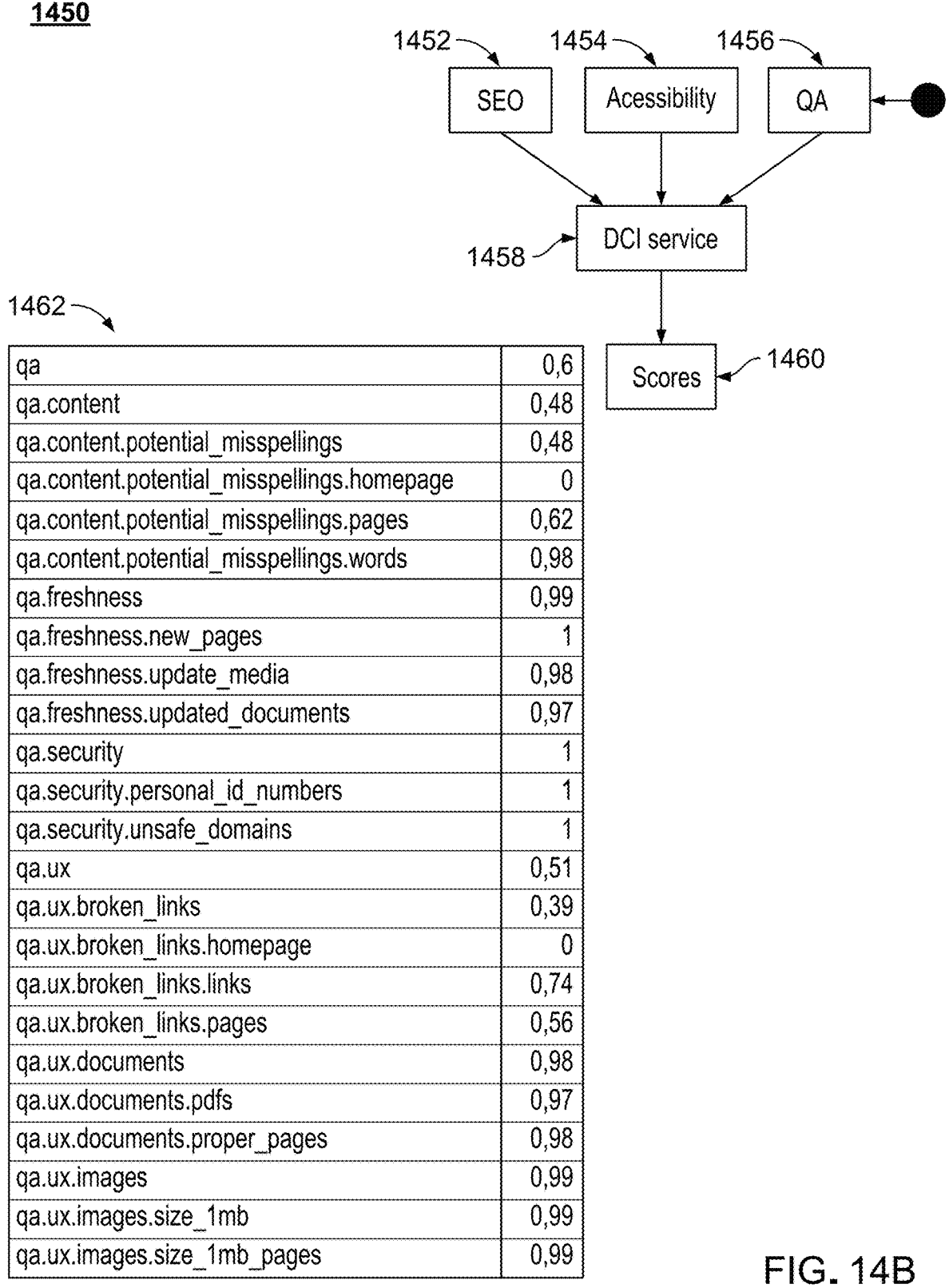

FIG. 14B is an illustrative example of the website scoring system generating website scores.

Figure 15A:
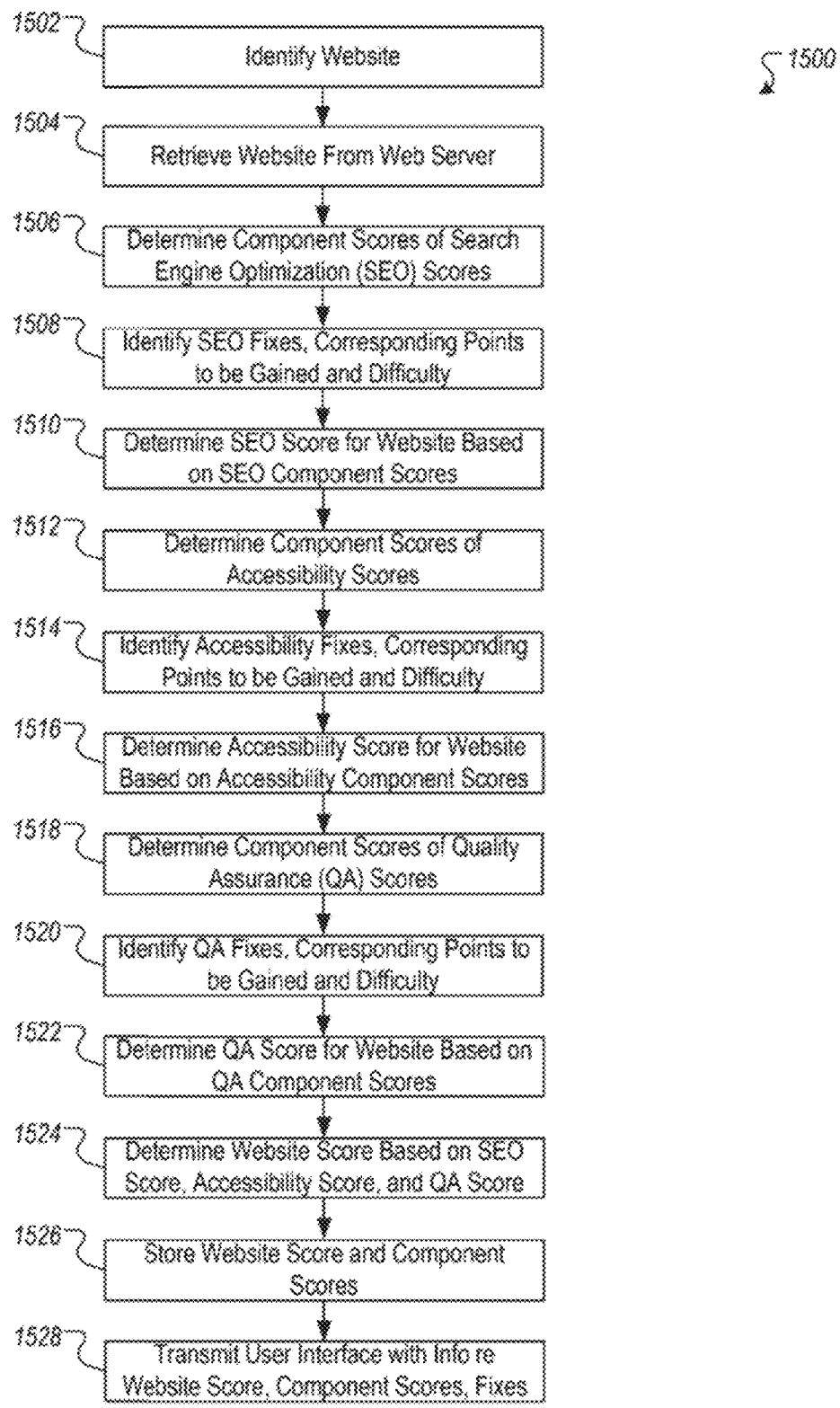
Figure 15B:
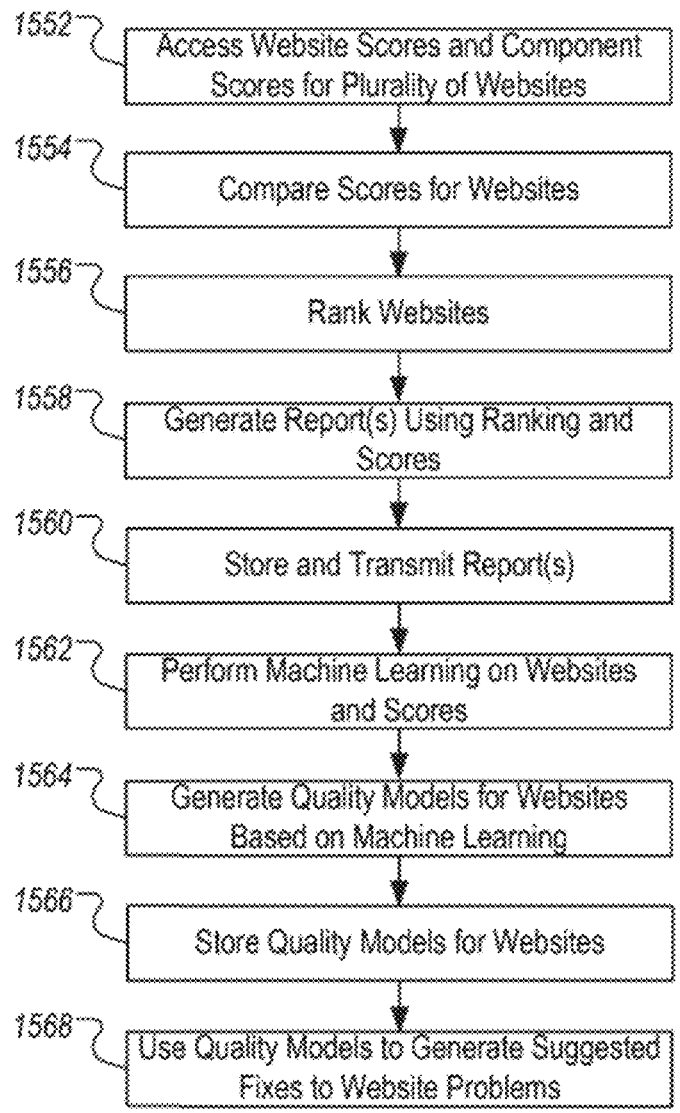
Figure 16:
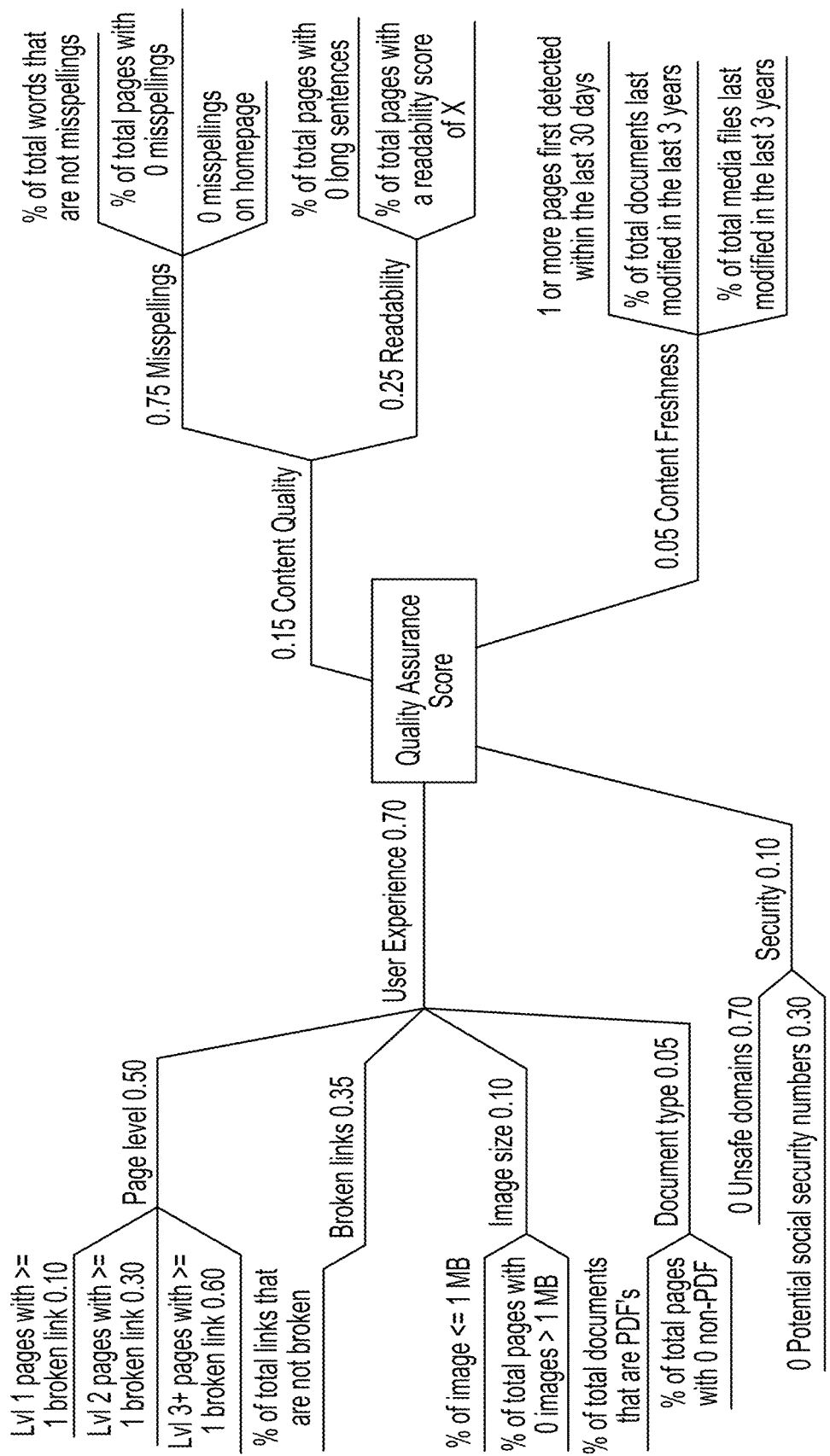
Figure 17A:
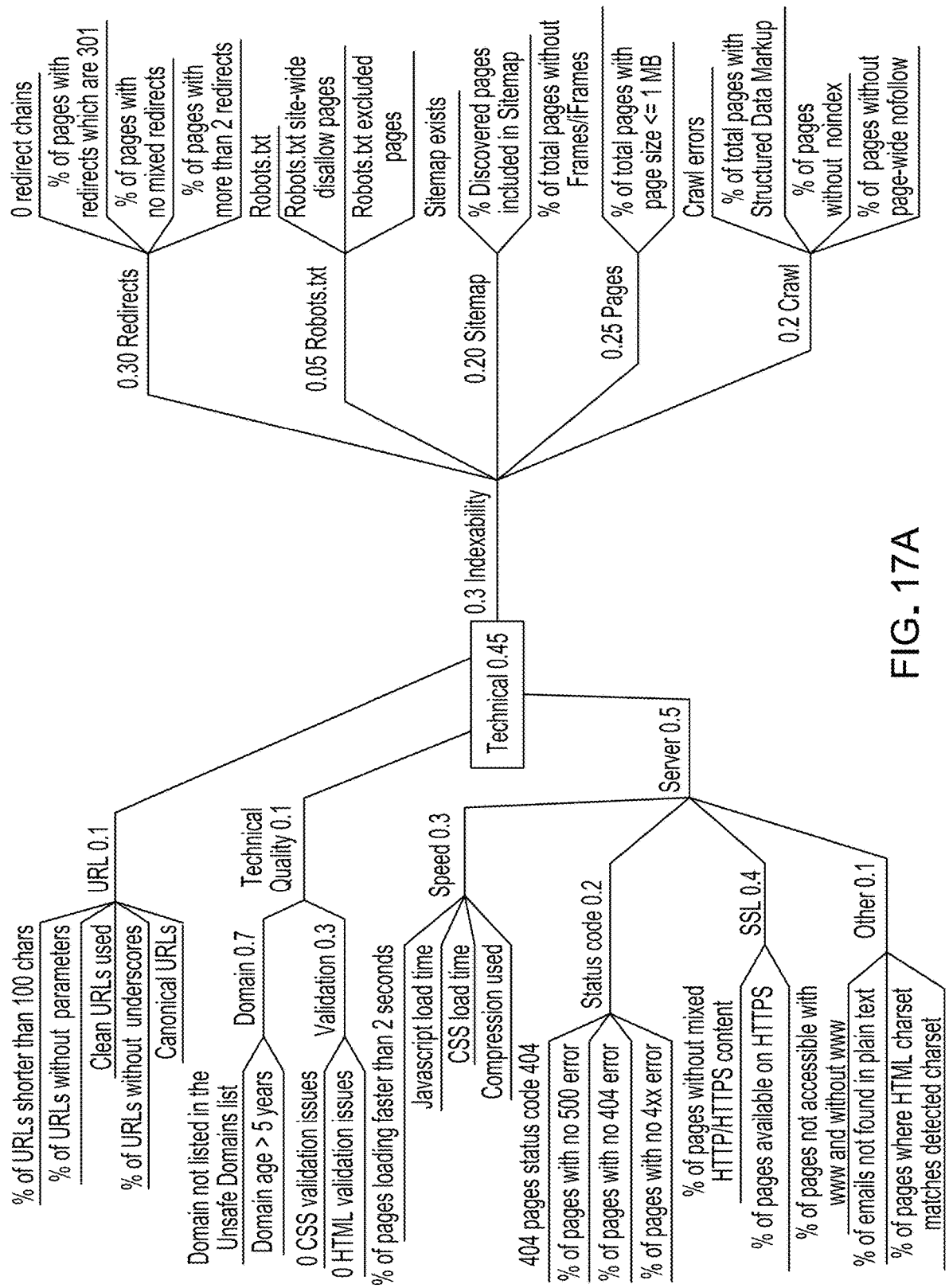
Figure 17B:
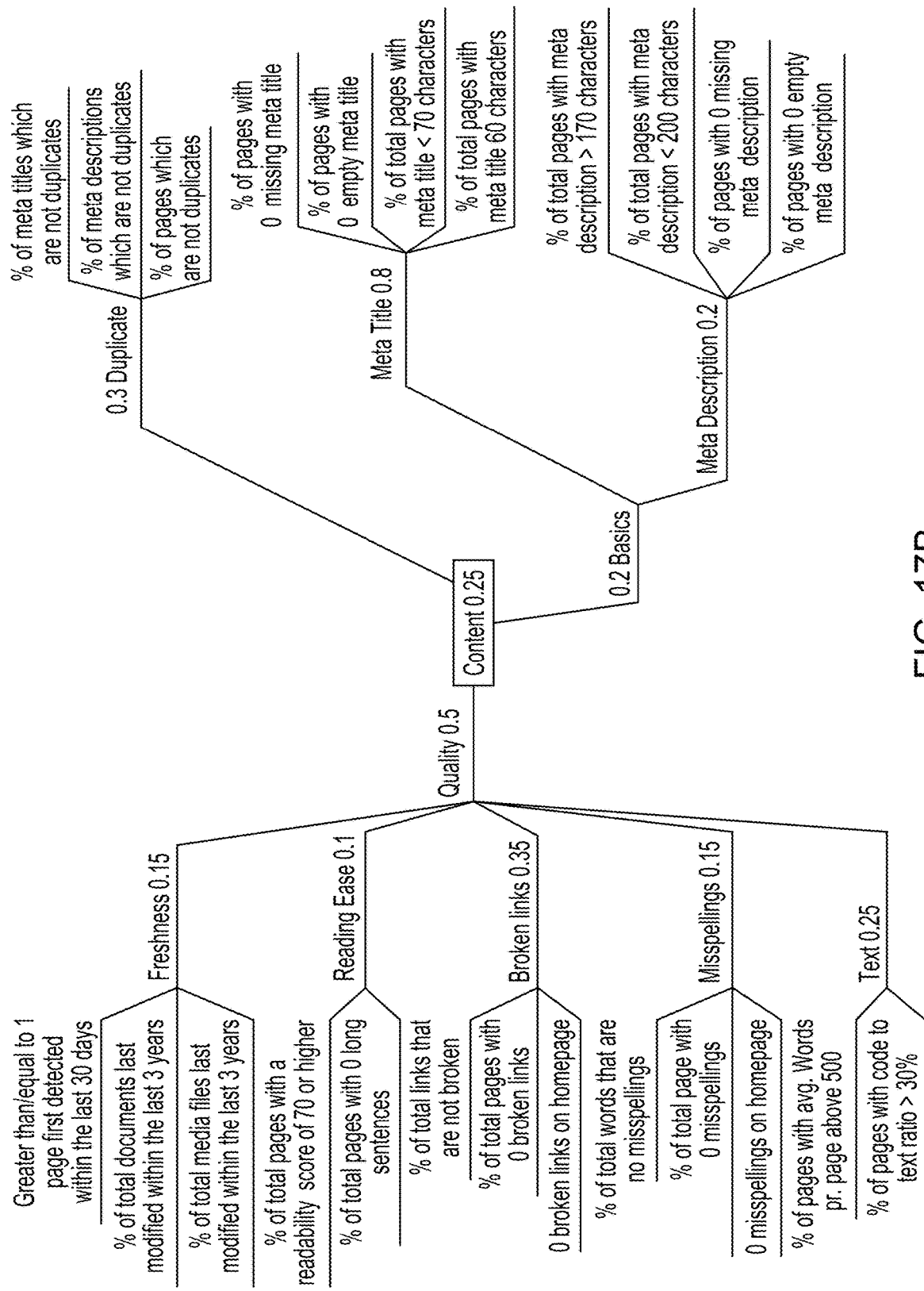
Figure 17C:
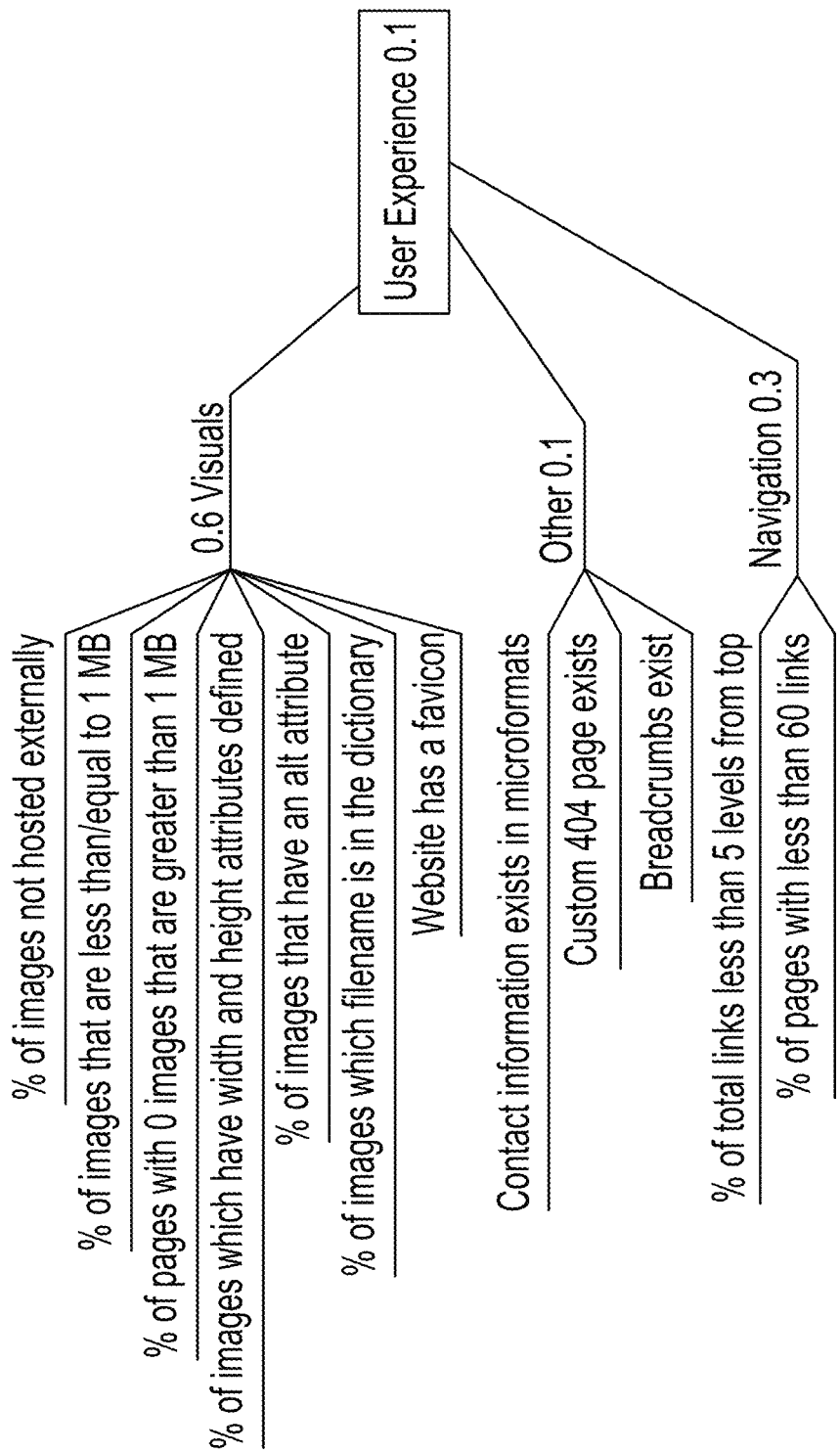
Figure 17D:
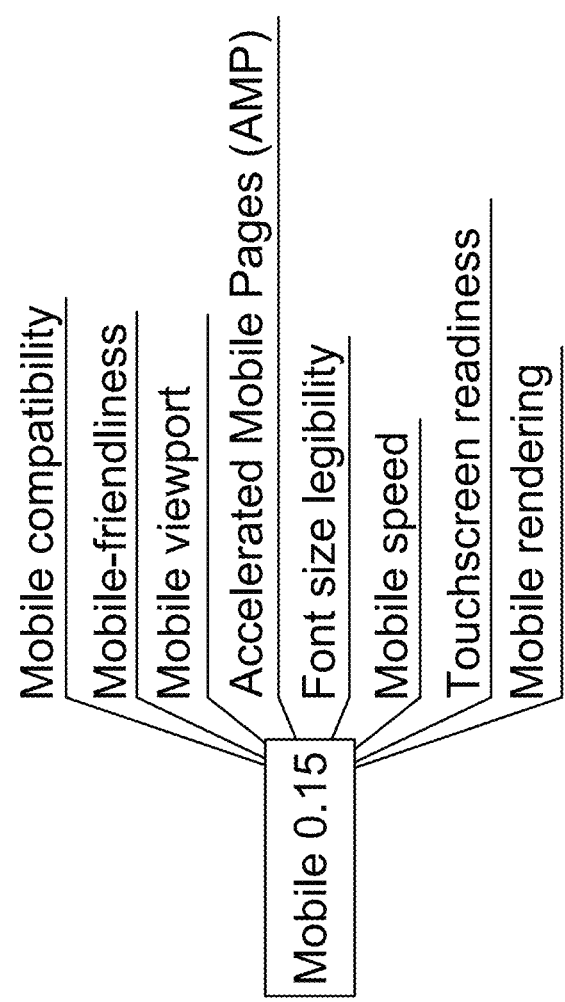

FIGS. 15A-B are example techniques for generating and transmitting website scores.

FIG. 16 and FIGS. 17A-D are diagrams of example scoring hierarchies and example weightings to generate QA scores (FIG. 16) and component scores for an SEO score (FIGS. 17A-D).

Figure 18:
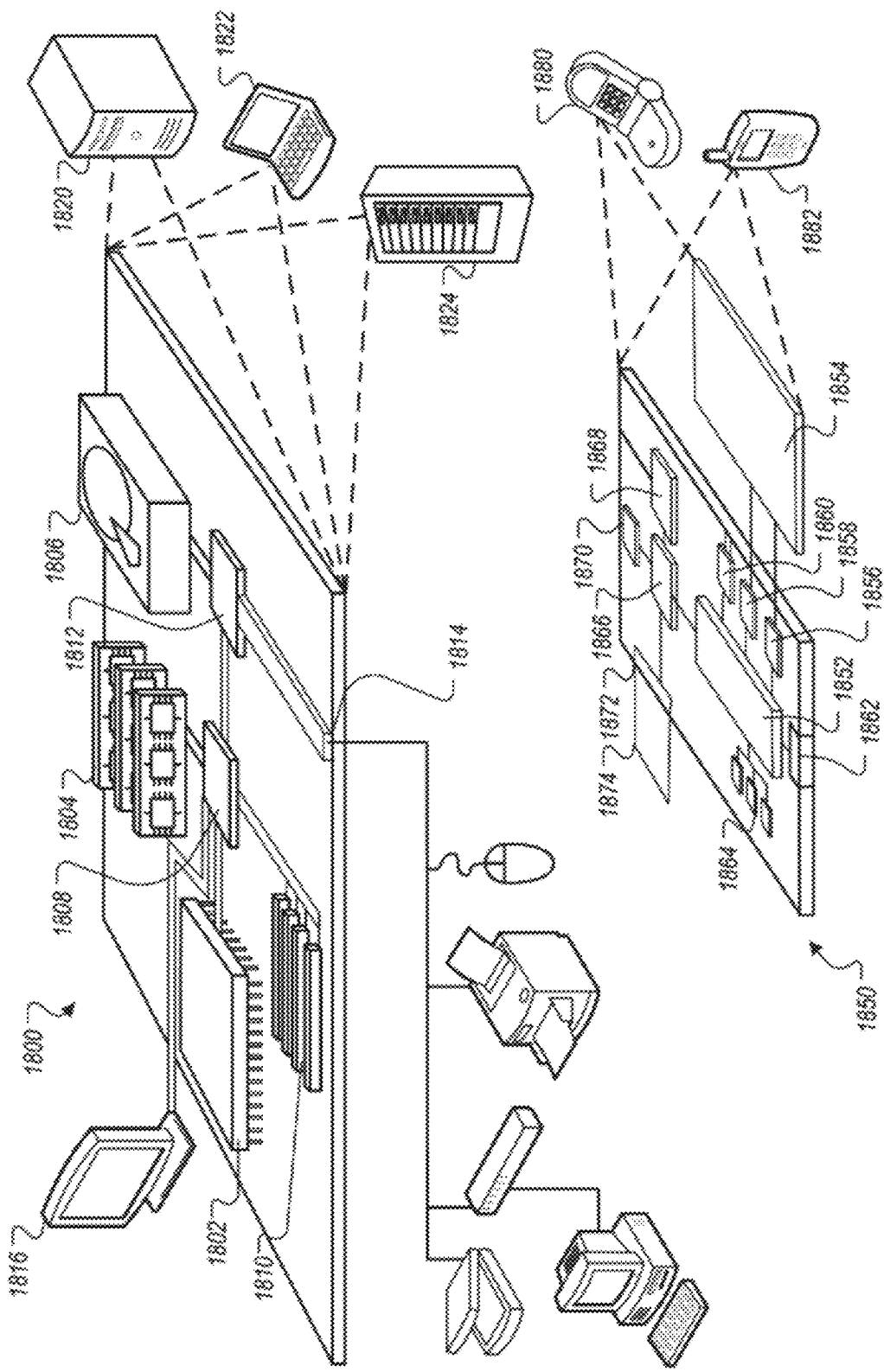

FIG. 18 is a block diagram of example computing devices that may be used to implement the systems and methods described in this document, as either a client or as a server or plurality of servers.

Like reference numbers and designations in the various drawings indicate like elements.

DETAILED DESCRIPTION

Scoring the quality of websites can be done using various techniques. However, for scoring techniques to be consistent and repeatable, the techniques can be based on the use of known bounds (or finite space). In this way, quality scores of websites can be used to compare the quality of websites across the Internet, including comparing the quality of an individual website over time (e.g., comparing website quality score for a particular website across several days). For example, each website can have its own quality score that serves as an individual index for the website.

In some implementations, quality scores can be generated using a same model for individual indexes, such as using a digital certainty index (DCI) that is easy to maintain and develop. The DCI can be used to generate quality scores for vertical comparison of websites, such as to compare all websites related to a same subject (e.g., cameras, sports, music, etc.), or to compare all websites in general. The use of a DCI model can be technically efficient to calculate can avoid large fluctuations that may otherwise occur with statistical weighting of metrics, which can permit for quality scores to be more efficiently determined (e.g., real time website quality score determination).

The DCI model can be part of a system that analyzes websites and generates scores that assess the websites across a number of metrics. The scoring technique can be easy for users to understand, such as users who are publishers or owners of websites, or users who plan to use the websites for some purpose. The scoring technique can generate a score that is efficient to calculate in real time. For example, a website owner can generate a score at any time to see how they are doing.

At a high level, the generation of scores can involve three main components that are combined to generate an overall score, in this case the DCI. The three scores can include, for example, a search engine optimization (SEO) score, an accessibility score (e.g., indicating whether the website is accessible to people with disabilities), and a quality assurance score indicating the quality of the website (e.g., broken links, misspellings). In some implementations, additional and/or alternate scores can be used to determine the DCI.

The use of scores associated with a website can be part of a quality assurance program used to uncover needle-in-a-haystack issues with a website. The issues can include, for example, broken links, misspelled words, and other characteristics. As an example, the use of the techniques and scores described in this disclosure can provide a complete overview of a website's web accessibility issues. User interfaces associated with presentation of the scores (and underlying determination thereof) can provide explanations of how the accessibility issues may affect users of the website, including providing specific recommendations on how to fix the accessibility issues. This can be beneficial, as an estimated one in five people in North America, for example, claim to have some sort of disability. In another example, an SEO score, for example, can help firms to proactively manage their SEO, including offering administrative tools for things such as managing keywords and page optimization relationships.

Figure 1:
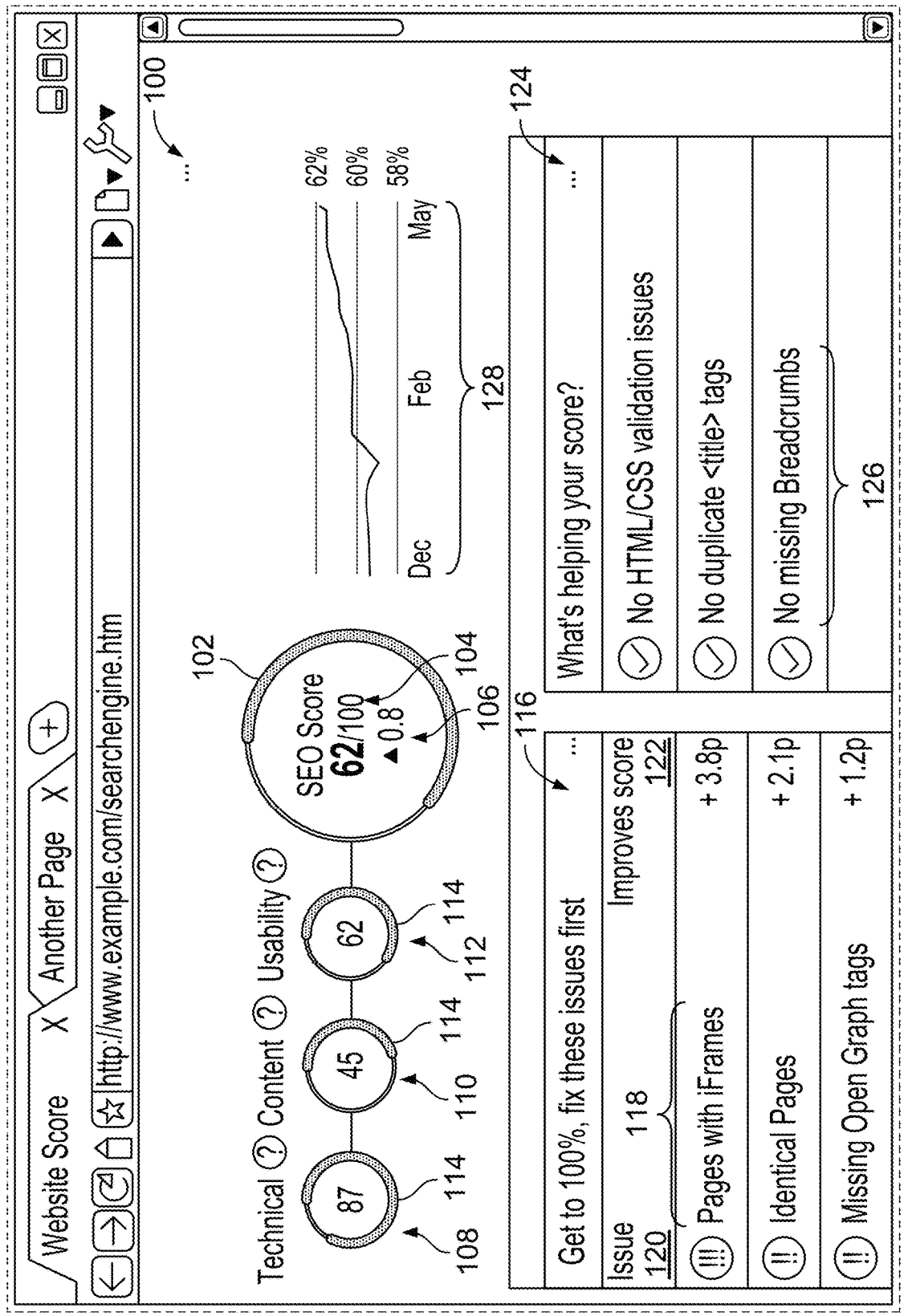
FIG. 1 is a screen shot of an example user interface for managing a website score.

FIG. 1 is a screen shot of an example user interface 140 for managing a website score. For example, a user can use the user interface 140 to display a current value of a search engine optimization (SEO) score 142 that is determined for their website. In some implementations, controls can be available on user interface 140 or directly on a particular website (e.g., in an admin view) that the user can select to generate the current value of the SEO score 142. The SEO score 142 can be provided in the user interface 140 as a number (e.g., 62) that is a score relative to a maximum value (e.g., 140). Providing the SEO score 142 can also include providing an improvement index 146, such as 0.8, indicating a percentage improvement in the SEO score 142 since the last time that the user requested a current SEO score 142. A negative value for the improvement index 146 can indicate that the quality of the website has decreased. As described above, the SEO score 142 can be one of three overall components of the DCI score that is a main feature of this disclosure. The same or different types of controls and features used in the user interface 140 for the SEO score 142 can be used for other components of the DCI score.

The SEO score 142 can be determined from a combination of a technical score 148 (e.g., shown having a value of 87), a content score 140 (e.g., shown having a value of 45), and a usability score 112 (e.g., shown having a value of 62). In some implementations, thick lines 114 can be used to indicate a percentage of 140% that is represented by each the respective scores 148-112. Other annotations are possible, including annotations that indicate, on a per-score basis, the improvement for each of the respective scores 148-112.

The user interface 140 includes a website issues area 116 that identifies, for the website in which the user is addressing, particular issues 118, a relative importance 120 of each issue, and a score improvement value 122 (indicating, for example, percentage point increases in the SEO score 142 that can be achieved if the issue is resolved). A score helper area 124 identifies website conditions 126 that need not be addressed by the user, as analysis of the website has determined that the website conditions 126 are already contributing to a higher value for the SEO score 142. A score history graph 128 can indicate a change in the SEO score 142 over time.

The user interface 140 (or other similar user interfaces) can be used to present other scores related to a website's quality. For example, the user interface 140 can present an overall website quality score the combines the SEO score 142 and other quality-related scores, such as an accessibility score, a quality assurance score, and/or other scores. Such an interface can permit for a user to drill-down into particular components of the scores (sub-scores), the basis for the scores, and other relevant information to the score.

Figure 2:
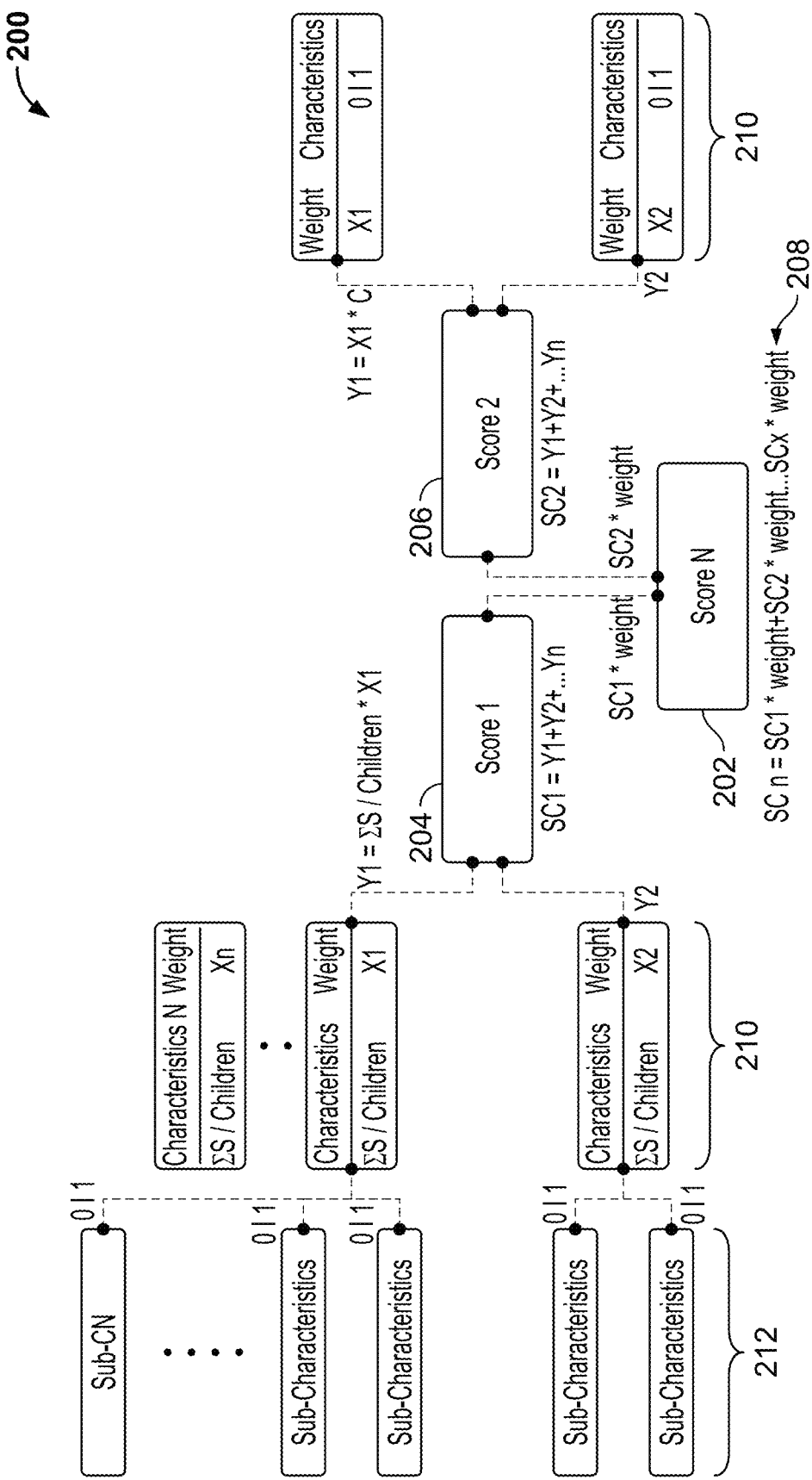
FIG. 2 is a graph showing a general calculation technique for determining a score.

FIG. 2 is a graph 200 showing a general calculation technique for determining a score. For example, a score N 202 can be calculated from scores 204 and 206 (and potentially other scores). The calculation of the score N 202 can be made using a score equation 208 that is based on the scores 204 and 206 (and potentially other scores) and weights that correspond to each score. The weights, for example can indicate a weighted amount that each of the scores 204 and 206 (and potentially other scores) has in determining the score N 202.

Each of the scores 206 and 208 can be determined from other sub-scores 210 that may be characteristics of websites that are comparable and easily measurable across all website (or subset of websites). The sub-scores 210 can each be based on sub-characteristics 212. Values used for determining the scores and sub-scores can be summations of component sub-scores or characteristics, and can further be weighted in some way. Sub-characteristics can have numeric values or can be binary, e.g., having a value of 1 or 0, indicating the presence or absence of the sub-characteristic.

Figure 3:
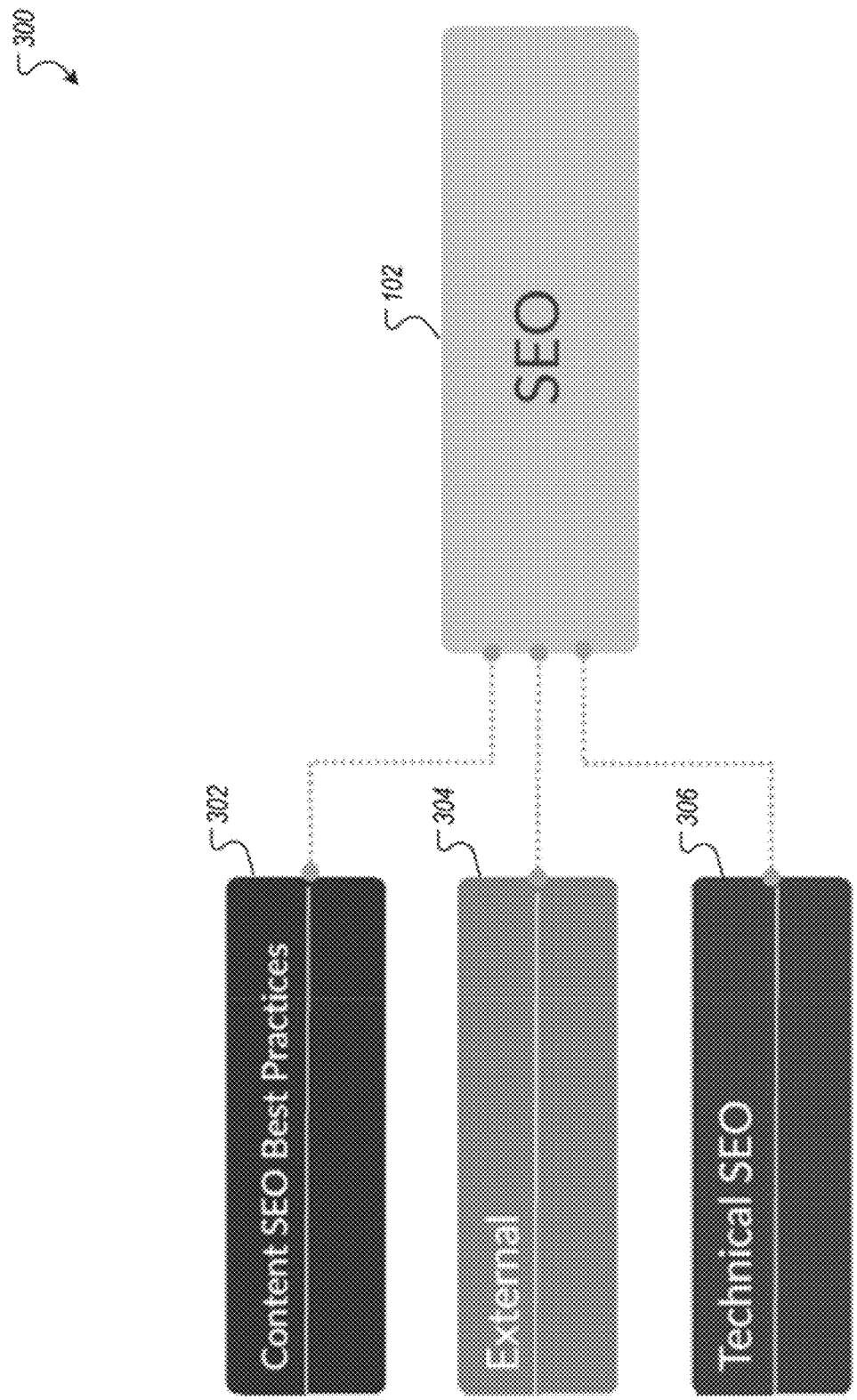
FIG. 3 is a graph showing an example calculation of a search engine optimization (SEO) score.

FIG. 3 is a graph 300 showing an example calculation of the SEO score 142. The SEO score 142 can be calculated, for example, from a content SEO best practices sub-score 302, an external score 304, and a technical SEO score 306.

Figure 4:
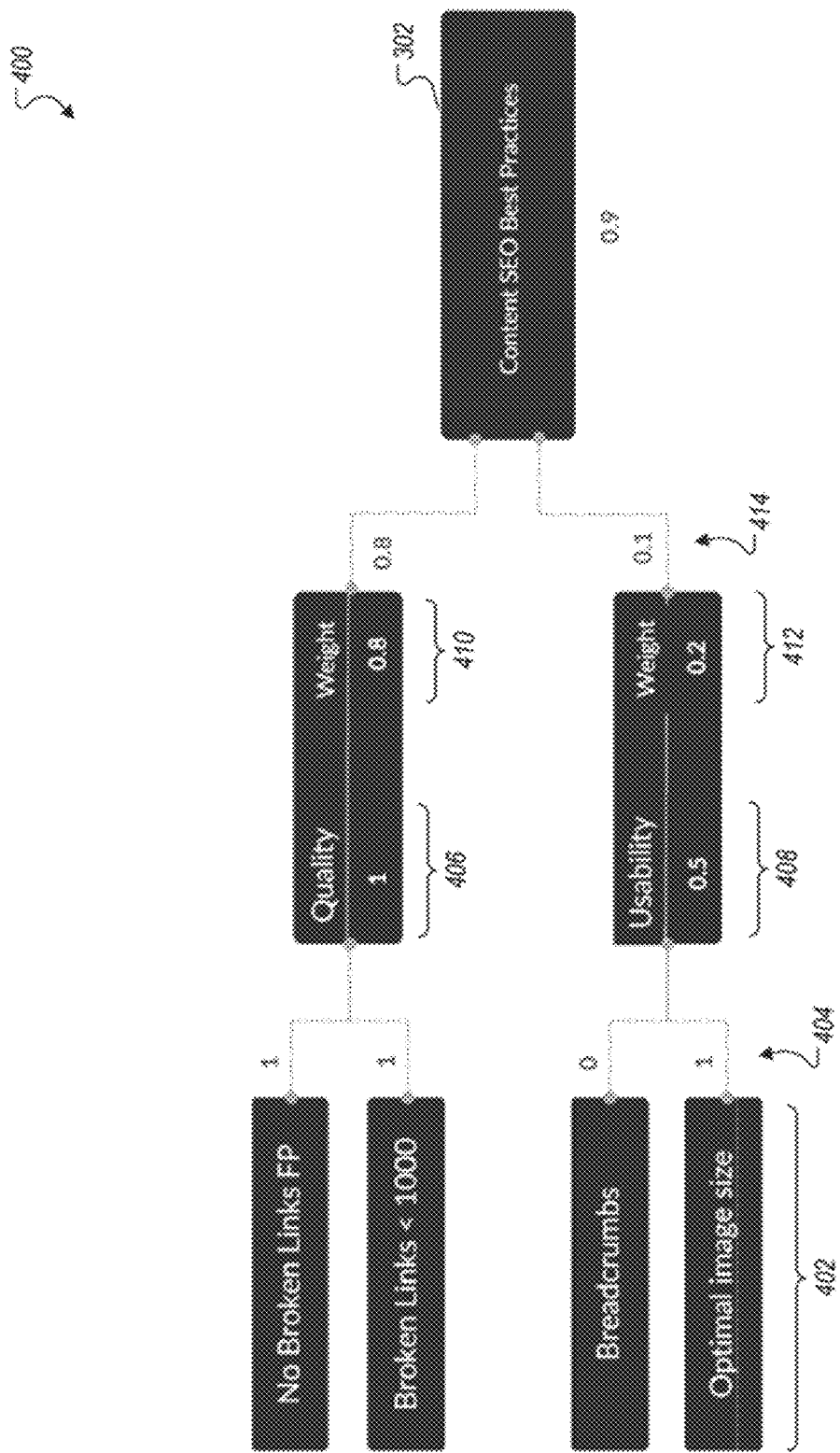
FIG. 4 is a graph showing an example calculation of the content SEO best practices sub-score.

FIG. 4 is a graph 400 showing an example calculation of the content SEO best practices sub-score 302. For example, the value of the content SEO best practices sub-score 302 can be based on characteristics 402, such as associated with the existence and/or count of broken links on the website, breadcrumbs on the website, and image sizes of images on the website. Each of the characteristics, for example, can be assigned a Boolean value 404. Boolean values associated with broken lines can be averaged, for example, to determine a quality score 406 (e.g., 1=average of Boolean scores of 1 and 1). Boolean values associated with breadcrumbs and image sizes can also be averaged, for example, to determine a usability score 408 (e.g., 0.5=average of Boolean scores of 0 and 1). Using a weight 410 (e.g., 0.8) for the quality score 406 and a weight 412 (e.g., 0.2) for the usability score 408, weighted scores 414 (e.g., 0.8 and 0.1) can be calculated. The weighted scores 414 can be summed, for example, to determine the content SEO best practices sub-score 302 (e.g., 0.9)

Figure 5:
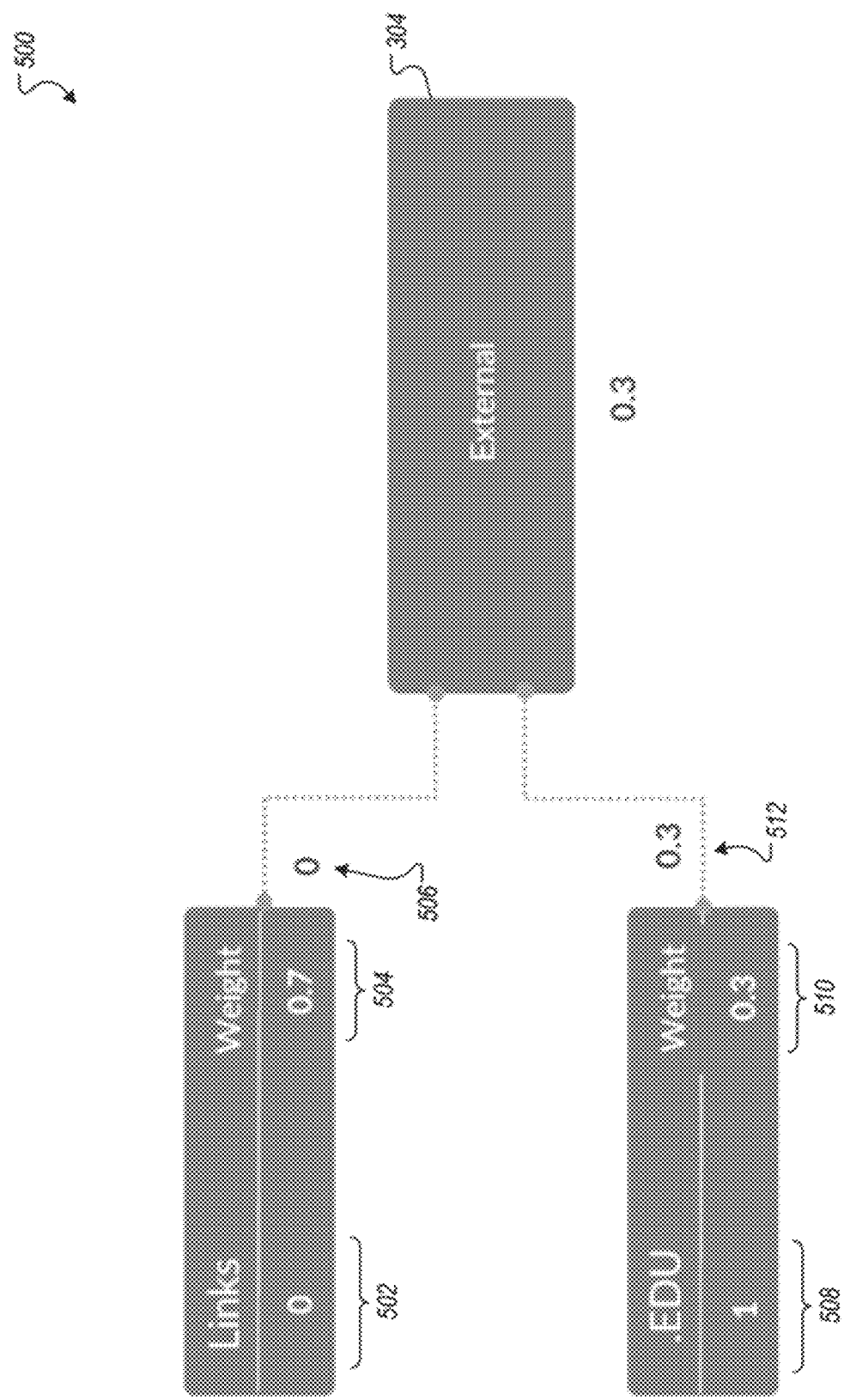
FIG. 5 is a graph showing an example calculation of the external sub-score.

FIG. 5 is a graph 500 showing an example calculation of the external sub-score 304. A links score 502 (e.g., 0.0, such as indicating that no links exist on the website, or otherwise the quality of the links is zero) can be combined with a weight 504 (e.g., 0.7) to determine a weighted score 506 (e.g., 0.0). An .EDU score 508 (e.g., 1, indicating that at least one .EDU link exists on, links to, or is otherwise associated with the website) can be combined with a weight 510 (e.g., 0.3) to determine a weighted score 512 (e.g., 0.3). The weighted scores 506 and 512 can be summed, for example, to determine the external sub-score 304 (e.g., 0.3).

Figure 6:
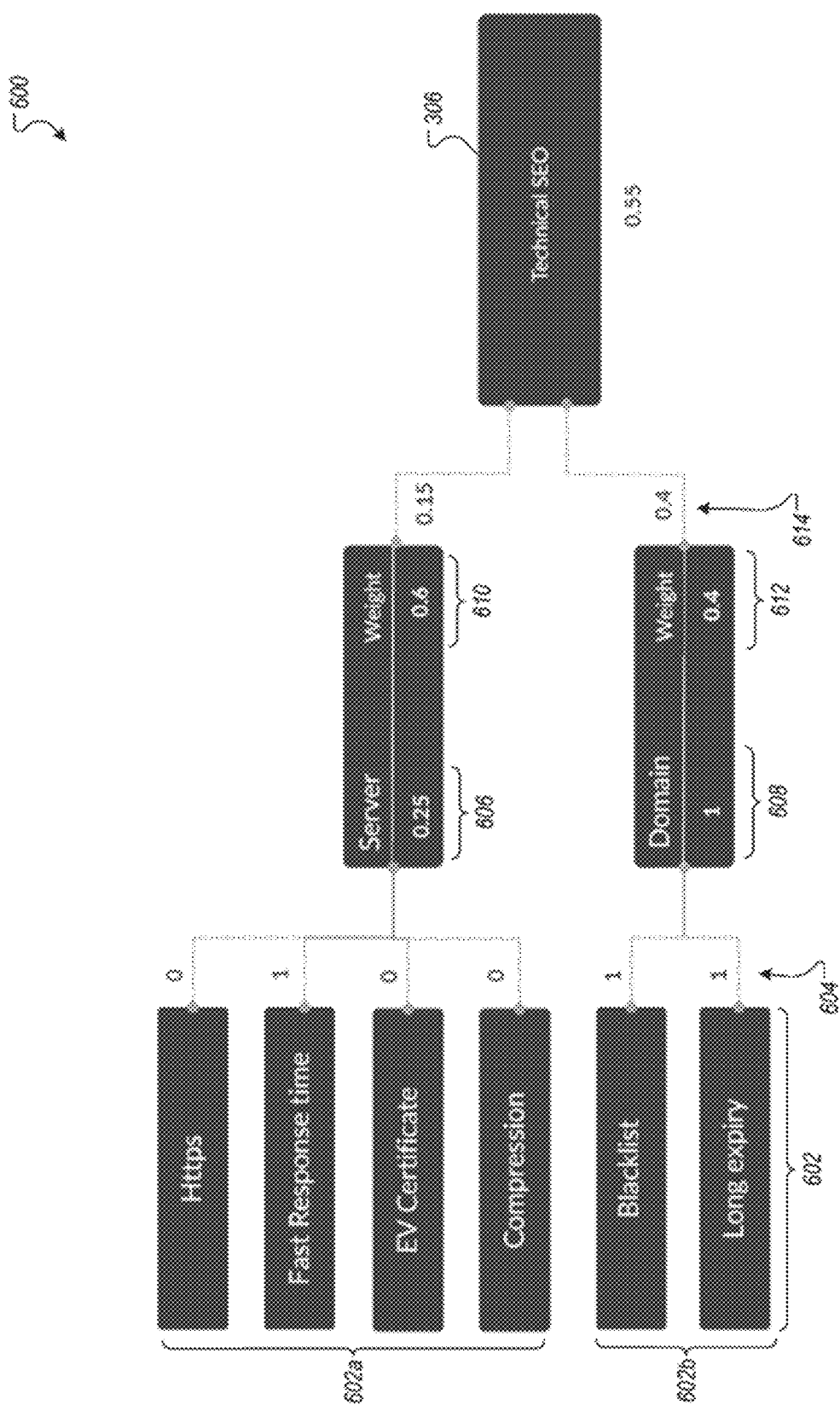
FIG. 6 is a graph showing an example calculation of the technical SEO score.

FIG. 6 is a graph 600 showing an example calculation of the technical SEO score 306. For example, the value of the technical SEO score 306 can be based on characteristics 602. Example characteristics, each of which having a Boolean value of 1 or 0, can include the following. An HTTPS characteristic can indicate, for example, whether the website has a security feature such as encryption. A fast response time characteristic can indicate, for example, whether the response time for the website is below a threshold time. An extended verification (EV) characteristic can indicate, for example, whether the website has an EV certificate. A compression characteristic can indicate, for example, whether the website uses compression. A blacklist characteristic can indicate, for example, whether the website is blacklisted (with a value of 1 indicating "no"). A long expiry characteristic can indicate, for example, whether the website is planned to exist for at least a threshold period of time. Each of the characteristics 602, for example, can be assigned a Boolean value 404. Boolean values associated with characteristics 602a can be averaged, for example, to determine a server score 606 (e.g., 0.25=average of Boolean scores of 0, 1, 0 and 0). Boolean values associated with characteristics 602b can also be averaged, for example, to determine a domain score 608 (e.g., 1.0=average of Boolean scores of 1 and 1). Using a weight 610 (e.g., 0.6) for the server score 606 and a weight 612 (e.g., 0.4) for the domain score 608, weighted scores 614 (e.g., 0.15 and 0.4) can be calculated. The weighted scores 614 can be summed, for example, to determine the technical SEO score 306 (e.g., 0.55)

Figure 7:
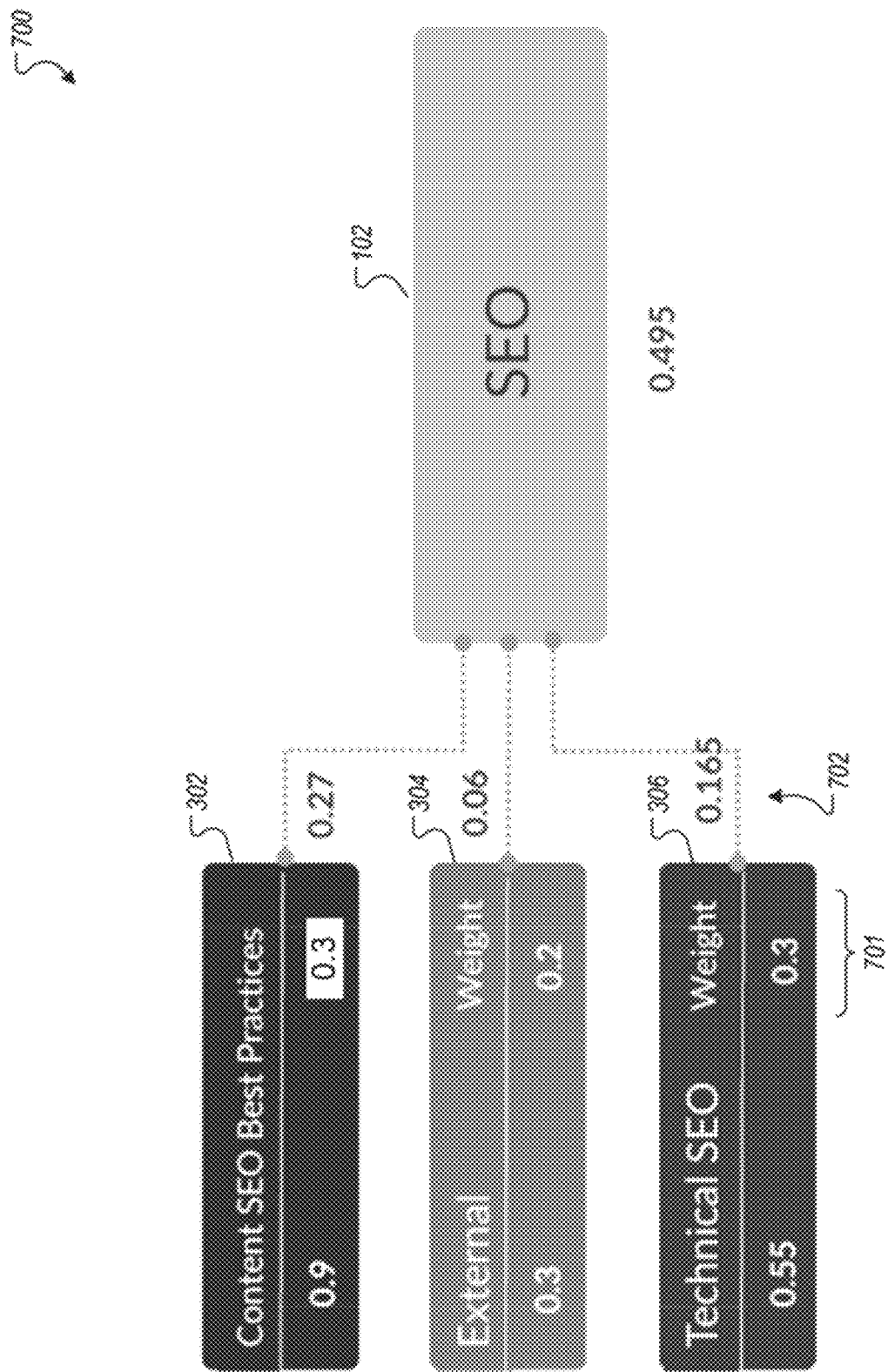
FIG. 7 is a graph showing an example calculation of the SEO score.

FIG. 7 is a graph 700 showing an example calculation of the SEO score 142. The SEO score 142 (e.g., 0.495) can be calculated for example, from the content SEO best practices sub-score 302 (e.g., having a score of 0.9 and a weight 701 of 0.3), the external score 304 (e.g., having a score of 0.3 and a 701 weight of 0.2), and a technical SEO score 306 (e.g., having a score of 0.55 and a weight 701 of 0.3). Weighted scores 702 indicate example products of the component scores and their weights, the products summing to 0.495. Weights can, but need not, sum to 1.0.

Figure 8:
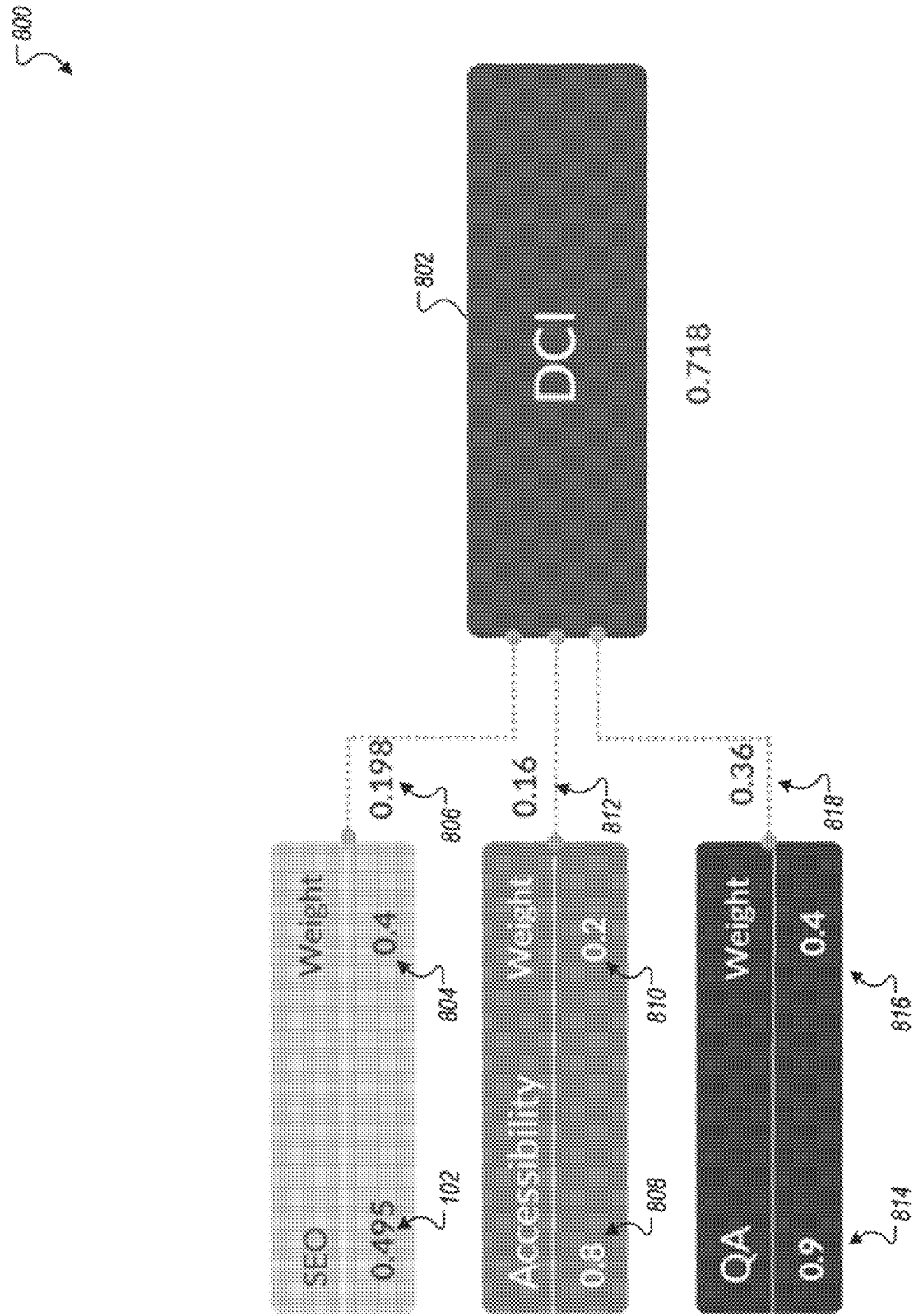
FIG. 8 is a graph showing an example calculation of a digital certainty index.

FIG. 8 is a graph 800 showing an example calculation of a DCI 802. The SEO score 142 (e.g., 0.495) can be multiplied by a weight 804 (e.g., 0.4) to determine a weighted SEO score 806 (e.g., 0.198). An accessibility score 808 (e.g., 0.8, indicating the accessibility of the website by special needs users) can be multiplied by a weight 810 (e.g., 0.2) to determine a weighted accessibility score 812 (e.g., 0.16). A quality assurance (QA) score 814 (e.g., 0.9, indicating the overall quality of the website) can be multiplied by a weight 816 (e.g., 0.4) to determine the DCI 802 (e.g., 0.718). In some implementations, other scores and/or weights can be used to calculate the DCI 802.

Figure 9:
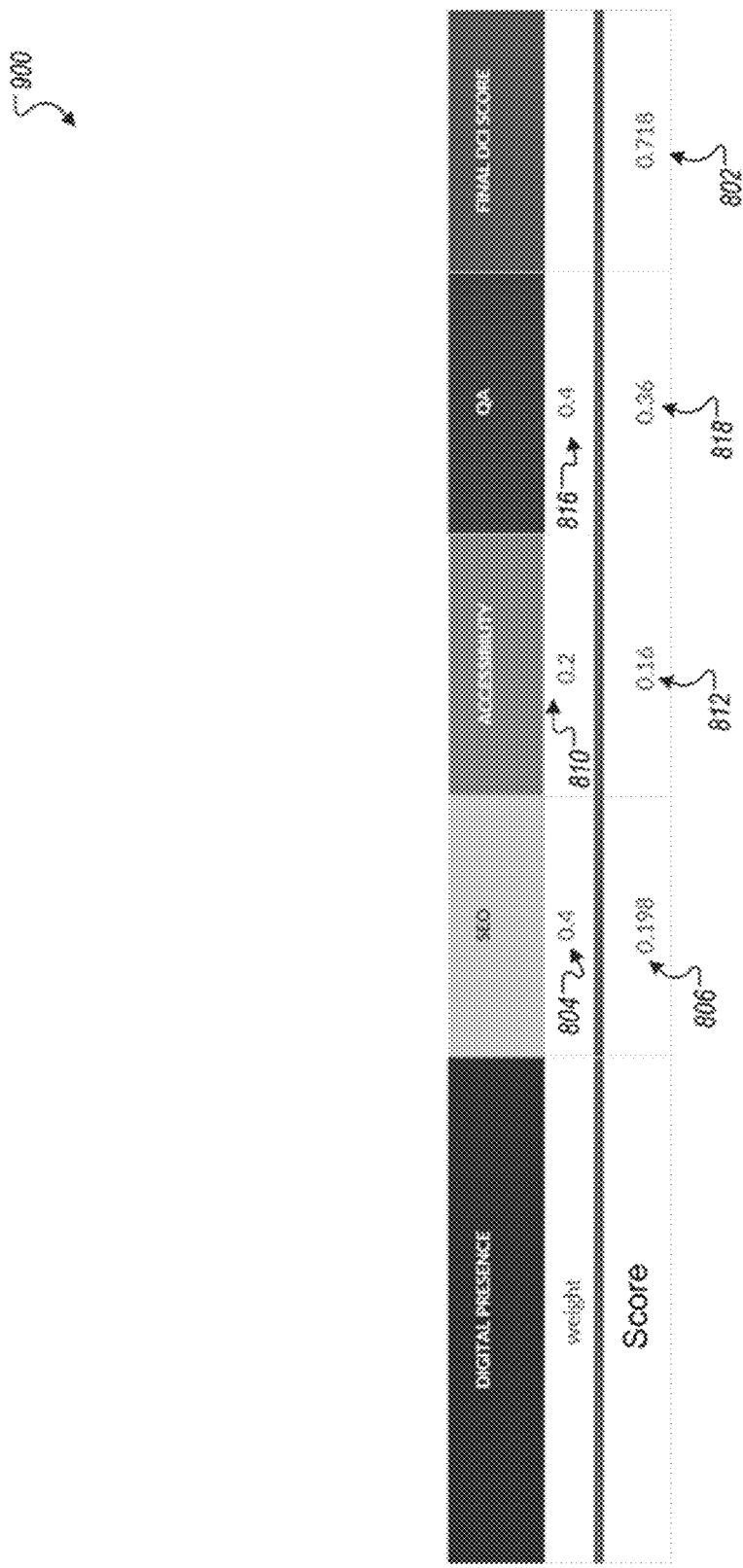
FIG. 9 is a table summarizing the example scores and their weights depicted in FIG. 8.

FIG. 9 is a table 900 summarizing the example scores and their weights depicted in FIG. 8. In some implementations, some or all of the scores 806, 812, 818, and 802 can be presented in the user interface 140 or some other user interface.

FIGS. 10A-B depict example user interfaces for presenting an example DCI score for a website. These example user interfaces can be used to present DCI scores, and their component scores that are combined to generate a DCI score, to a user along with additional information that the user can review to understand the factors underlying the DCI score and specific website improvements (and their potential and specific impact) on the DCI score.

Figure 11C:
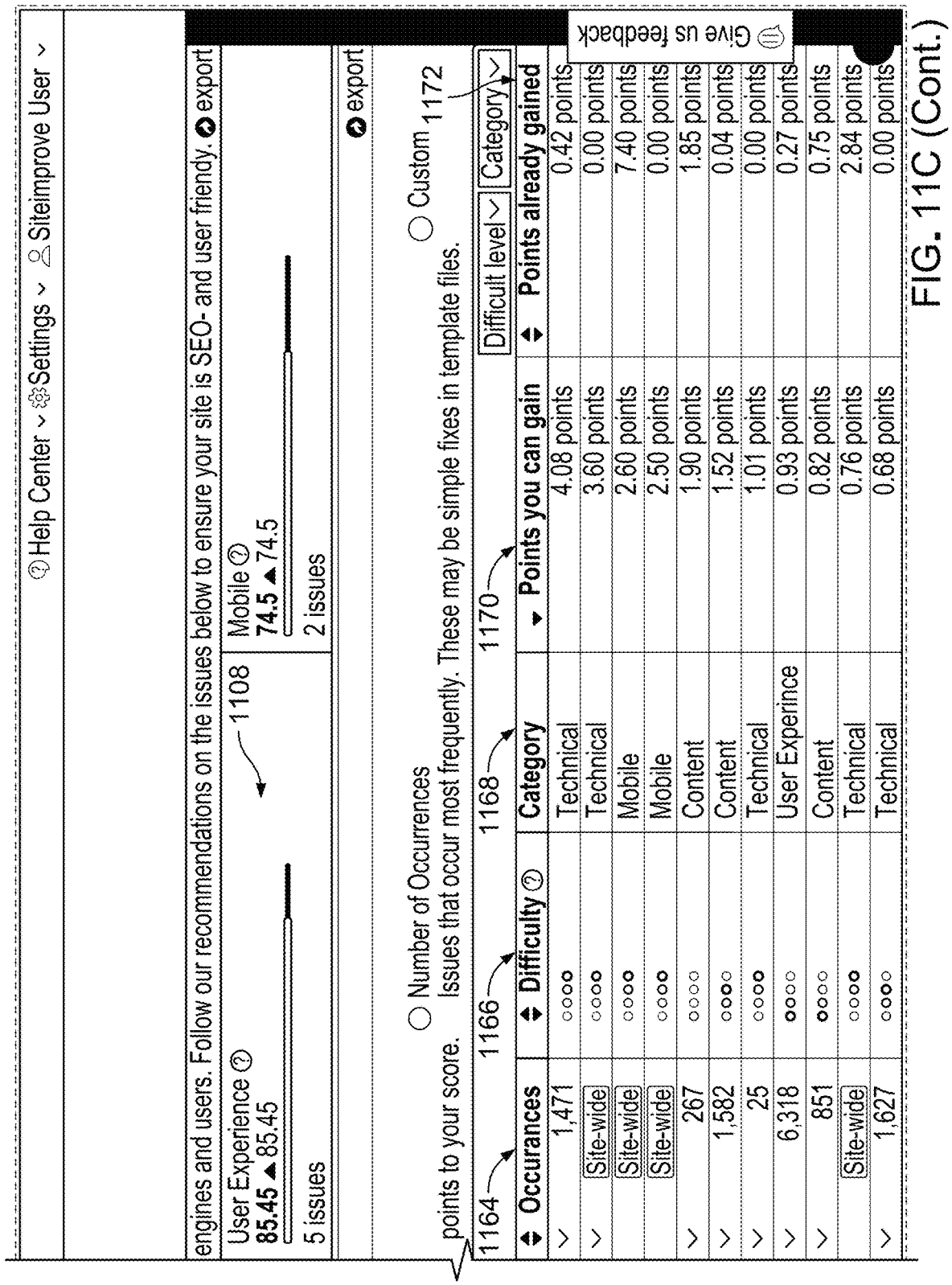

Referring to FIG. 10A, a first example user interface 1000 providing a DCI dashboard is presented. The DCI dashboard includes the current DCI index score 1002 for the website being assessed as well as the component scores 1004-1008 (quality assurance score 1004, accessibility score 1006, SEO score 1008) that underlie the DCI score 1002. Each of the DCI scores 1002 and the component scores 1004-1008 are presented with a numerical value 1010a-d, a graphical feature (circle) 1012a-d that represents the numerical value within the range of possible scores (amount of circle filled-in corresponds to score within range of possible scores), a graphical feature (smaller circle positioned along perimeter of larger circle) 1014a-d and numerical value corresponding industry benchmark score (e.g., benchmark score for other websites in the industry, such as the average, median, or representative score for other websites in the industry), selectable features 1016a-d through which a user can investigate the score further (e.g., larger circle can be selectable to present UIs depicted in FIGS. 11-13), and a selectable feature 1018a-d to learn how to improve the score (e.g., selectable button below each score feature).

As described above, the DCI score 1002 can be a measure of the quality and potential impact of a site's digital presence, including a website's accessibility and usability (accessibility score 1004), the website's credibility and trustworthiness (quality assurance score 1006), and how well-poised a website is to respond to SEO challenges (SEO score 1008). The DCI score 1002 can be calculated utilizing website tests across three categories, i.e. Quality Assurance, SEO, and Accessibility. The overall DCI score 1002 and sub-scores 1004-1008 can range from, for example, 0 to 100. A DCI score of 100 indicates that a website is in excellent condition. The DCI score 1002 can be used to guide users on how to improve digital performance most efficiently, including suggestions on improvements as well as the impact of those improvements on the DCI score 1002. For example, a DCI score overview interface (e.g., FIG. 10B) can present issues to be addressed which are prioritized in order of impact on a DCI score 1002 and therefore on a website's digital presence. A user can address issues across all modules using the features presented in the interface to systematically fix these issues list on a DCI overview interface. The DCI score 1002 can be a combination of the quality assurance score 1004, the SEO score 1008, and the accessibility score 1006—meaning that improving these scores 1004-1008 can improve the overall DCI score 1002. These scores correspond to:

Quality Assurance Score 1004: This score reflects a website's credibility and trustworthiness regarding its user-facing characteristics. A site's Quality Assurance Score can be determined, for example, by its performance in four subcategories:
i. Content Quality,
ii. Content Freshness,
iii. User Experience, and
iv. Security.

SEO Score 1008: This score is a measure of how well the user-facing and technical aspects of a site contribute to search engine optimization, and ultimately, higher rankings and organic traffic. A site's SEO score can be determined by its performance in the four sub-categories:
i. Technical,
ii. Content,
iii. User Experience, and
iv. Mobile.

Accessibility Score 1006: This score is a measure of how well a website tests against web accessibility standards, such as those set out in WCAG (Web Content Accessibility Guidelines) 2.0 (and any subsequent updates). A site's Accessibility Score is determined by its performance on individual checks under these standards, such as checks against the three WCAG conformance levels (A, AA, AAA), and how well the website code validates under various web protocols/languages, such as validation under in HTML and CSS.

Referring to FIG. 10B, an example user interface 1050 providing a DCI overview is presented. In this example user interface 1050, the DCI score 1002 is presented in the center-top (similar to FIG. 10A) along with the component scores 1004-1008 (sliders to the left-top). The progress of the DCI score 1002 for the website is presented in a graph 1052 (right-top) so that a user can visualize the change in the DCI score 1002 for the website over time. Issues that can be fixed to improve the DCI score are presented in the lower left corner 1054, with each issue specifically identified (1056) along with the category/component score (1058) to which it applies (e.g., SEO, accessibility, etc.) and the impact on the score that can be gained by fixing the issue (1060). The lower right hand corner (1062) presents the issues that have been recently fixed along with the specific improvement to the DCI score that was gained by the fix. These fixes are also presented with the associated category/component score to which they apply.

FIGS. 11A-C depict example user interfaces 1100, 1130, 1160 for users to view SEO score information for a website. A user can navigate to these interfaces from, for example, the interfaces depicted in FIGS. 10A-B.

The SEO Score 1008 is a measure of how well the user-facing and technical aspects of your site contribute to search engine optimization, and ultimately, higher rankings and organic traffic. A website's SEO Score can determined by its performance in four subcategories 1002: Technical Score 1104, Content Score 1106, User Experience Score 1108, and Mobile Score 1110. Individual checks with different weightings can be aggregated to provide a score for each of these subcategories 1102. Some checks are scored solely on whether an element is absent or present (e.g. whether a site has a sitemap), while other checks are scored on percentage completed (e.g. the percentage of pages with no 404 error). The description below provides explanations of the scores for each subcategory and the factors to enhancing a site's SEO Score 1008, and an example weighting for each subcategory 1102 to the SEO Score. Other subcategories can additionally and/or alternatively be used to generate the SEO Score 1008.

Technical SEO Score 1104—this represents how optimized a site's technical elements are for being crawled by search engine bots. If a site isn't properly indexed, it will not be ranked by search engines and no amount of quality on-page content or links will bring visitors to the site. Hence Technical SEO Score 1104 can be a key driver of organic traffic. Example weighting can be 45% (other weighting is also possible). Factors impacting the Technical SEO Score 1104 include:

Search-engine friendly URLs (e.g., URLs that are meaningful to users, don't link to duplicate content, use hyphens rather than underscores where possible), Technical quality—quality as perceived by search engines (e.g., domain is not flagged as unsafe, HTML and CSS validation show site is error free), Server response—server loads pages quickly and securely over HTTPS connection and returns no errors (e.g., returns no 404, 500, or 4XX status errors), and Indexability—ability of site to be readily indexed (e.g., presence of sitemap, structured data markup tells search engine how and what to index on site, noindex and nofollow tags used appropriately and sparingly to prevent search engines from indexing or passing authority to un-endorsed sites, minimal page redirects or only 301 redirects to avoid ranking penalties).

Content SEO Score 1106—this represents the quality of a site's visitor-facing content with respect to how it engages users, and how well the meta-content aligns with the site content. Accurate, descriptive metacontent sets visitor expectations, and together with high-quality site content, ensures visitors don't bounce back to the search engine. Good visitor engagement levels in turn mean that a site's content is relevant and will be ranked higher by search engines. Example weighting can be 25% (other weighting is also possible). Score components for Content SEO Score 1106 include:

User content quality (e.g., content is current, concise, easy to read, has high editorial quality, few broken links), Indexable meta-content (e.g., meta-titles and/or short descriptions present for pages), and Unique content (e.g., no duplicate page titles or meta-content present).

User Experience SEO Score 1108—this represents How effectively embedded information like links and visuals is used to enhance the user experience. For example, a well-organized link hierarchy and properly defined images boosts a site's usability and indexability. Example weighting can be 10% (other weighting is also possible). Factors going into the user experience SEO score include:

User-friendly visuals (e.g., images are retrievable, accessible and don't slow down page loading time), and User-friendly navigation (e.g., most important pages are readily accessed two or three clicks from homepage, user not overwhelmed by abundance of links).

Mobile SEO Score 1110—this represents how responsive and adaptable a site is to being used and displayed on a mobile device. Example weighting can be 20% (other weighting is also possible). Factors going into this score include:

Responsiveness (e.g., content is dynamic and optimized for mobile OS),

Touchscreen readiness (e.g., site optimized for touchscreen functionalities, such as tapping and scrolling), and Speed (e.g., site loads quickly on a mobile platform, uses accelerated mobile pages (AMP) publishing format to load pages faster than standard HTML).

As depicted in FIG. 11A, the SEO score 1008 for a site can be presented along with its component scores in an interface that is similar to the overview interface described above with regard to FIG. 10B. One additional feature that is depicted, though, is a ranking of the difficulty for various fixes (lower left corner) to provide a user with an idea of how much effort/time will need to be expended in order to implement each fix.

Referring to FIG. 11B, an example user interface 1130 depicting a detailed SEO score breakdown 1132 for a site is presented, including each of the components scores for the site and the corresponding scores 1134 for each of those components.

Referring to FIG. 11C, an example user interface 1160 depicting the possible SEO score fixes 1162 that can be implemented along with the number of occurrences 1164, the difficulty 1166, the category 1168, the number of points that can be gained by the fix 1170, and the number of points already gained 1172 are presented.

FIGS. 12A-B depict example user interfaces 1200, 1250 for users to view quality assurance score information for a website. A user can navigate to these interfaces from, for example, the interfaces depicted in FIGS. 10A-B.

The Quality Assurance (QA) score 1004 is a measure of the credibility and usability of the user-facing characteristics of a site. The QA Score 1004 can be seen on the Dashboard (FIGS. 10A-B) and on the Quality Assurance Overview page (FIG. 12A) for the site, for example. A site's QA Score 1004 can be determined by its performance in four subcategories 1202, i.e. Content Quality Score 1204, Content Freshness Score 1206, User Experience Score 1210, and Security Score 1208. Example factors and different weightings for the QA score are presented below. Additional and/or alternative subcategories can be used to determine with QA Score 1004.

Content Quality QA Score 1204—represents the editorial quality of a site's content, which affects how quickly and accurately users can comprehend the site. Example weighting can be 35% (other weighting is also possible). Factors going into this score include:
  Misspellings on site (e.g., fewer can boost score, fewer on homepage and other heavily trafficked pages can boost score), and
  Good readability score across all pages.

Content Freshness QA Score 1206—represents how up-to-date the content on the site is. Example weighting can be 10% (other weighting is also possible). Factors going into this score include:
  Frequency with which new pages are added (e.g., more frequently adding new pages can boost score), and
  Frequency with which documents and media files are updated (e.g., more frequent updates can boost score).

User Experience QA Score 1210—represents how conducive a site's content is to the smoot navigation of a site. Example weighting can be 45% (other weighting is also possible). Factors going into this score include:
  Few or no broken links,
  Few or no non-pdf documents (e.g., documents not universally accessible), and
  Few or no large images or other files (e.g., few images with size over 1 MB).

Security QA Score 1208—represents how vigilant the site has been in only linking to safe domains and in keeping users' personal information private. Example weighting can be 10% (other weighting is also possible). Factors going into this score include:
  Whether the site links to unsafe domains, and
  Whether personal IDs are used on the site.

As depicted in FIG. 12A, the quality assurance score 1004 for a site can be presented along with its component scores 1202 in an interface 1200 that is similar to the overview interface described above with regard to FIGS. 10B and 11A.

Referring to FIG. 12B, an example user interface 1250 is depicted showing the quality assurance score breakdown 1252 for a site, similar to the interface depicted in FIG. 11B, along with the corresponding scores 1254 for each of the components that are used to determine the quality assurance score 1004.

FIGS. 13A-B depict example user interfaces 1300, 1350 for users to view accessibility score information for a website. A user can navigate to these interfaces from, for example, the interfaces depicted in FIGS. 10A-B.

The Accessibility Score 1006 is a measure of how well a site meets accessibility standards, such as the standards set out in WCAG 2.0 (and any subsequent updates). The Accessibility score 1006 can be seen on the Dashboard (FIGS. 10A-B) and on the Accessibility Overview page (FIG. 13A) for the site. A site's Accessibility score 1006 can be determined by its performance on individual checks, for example, under the three WCAG conformance levels (A, AA, AAA) 1304, 1306, whether any warnings are generated at any level 1308, and pages that include multiple errors 1310. Additional and/or alternative components can be used to generate the Accessibility Score 1006, such as determinations of how well the website code validates under various web languages/protocols, such as HTML and CSS. Components of the accessibility score and their weighting are described below.

The WCAG is a globally recognized standard for website accessibility conformance. WCAG includes three levels of conformance (A, AA, AAA) measured across 60+ success criteria, derived from four core principles Perceivable, Operable, Understandable, and Robust. Each success criteria can be tested for conformance either automatically, manually or a combination of both. "Perceivable" is a WCAG requirement for information and user interface components to be presentable to users in ways they can perceive. This means that users must be able to perceive the information being presented (it can't be invisible to all of their senses). "Operable" is a WCAG requirement for user interface components and navigation to be operable—meaning that users must be able to operate the interface (the interface cannot require interaction that a user cannot perform). "Understandable" is a WCAG requirement for information and the operation of user interface to be understandable—meaning that users must be able to understand the information as well as the operation of the user interface (the content or operation cannot be beyond their understanding). "Robust" is a WCAG requirement for content to be robust enough that it can be interpreted reliably by a wide variety of user agents, including assistive technologies. This means that users must be able to access the content as technologies advance (as technologies and user agents evolve, the content should remain accessible).

For the Accessibility scoring, "errors" and "warnings" are treated differently and used to determine the Accessibility Score. "Errors" represent failures to meet a WCAG success criteria that can be tested automatically. Errors also represent HTML and CSS validation issues. HTML and CSS errors can directly impact WCAG conformance and website accessibility in general. "Warnings" are official "advisory techniques" for each WCAG success criteria. Warnings are considered "best practices" that are not required to pass each success criteria, but can be used to enhance accessibility.

Level A Errors (1304)—represents the minimum level of conformance under WCAG (e.g., site meets all or most of the Success Criteria under Level A). Example weighting can be 50% (other weighting is also possible). Errors include Level AA Errors (1306)—represents the second level of conformance under WCAG (e.g., site meets all or most of the Success Criteria under Level A and AA). Example weighting can be 30% (other weighting is also possible).

Level AAA—represents the third level of conformance under WCAG (e.g., site meets all or most of the Success Criteria under Level A, AA, and AAA). Example weighting can be 10% (other weighting is also possible).

Warnings at any WGAG level (1308)—represents warnings that are generated for any of Levels A-AAA.

Pages with multiple Level A-AA errors (1310)—represents pages that include multiple errors at one or more of Level A and AA. The more accessibility issues there are on a given page the more potential barriers a user may experience when trying to complete a task. Pages with multiple Level A/AA errors represents a weighted measurement of the proportion of pages which have two or more WCAG A or AA errors. Pages at a higher 'level' in the site structure can be weighted more heavily. 'Level' refers to the number of clicks between any given page and the homepage. For example, an internal link on the homepage will bring a user to a page at level 2.

Code validations—represents how well a site's code validates under web standards, such as HTML, CSS, and/or others (e.g., fewer errors returned, the higher the score under this category). Example weighting can be 10% (other weighting is also possible).

As depicted in FIG. 13A, the accessibility score 1006 for a site can be presented along with its component scores 1302 in an interface that is similar to the overview interface described above with regard to FIGS. 10B, 11A, and 12A. One additional feature that is presented in FIG. 13A, though, are the tabs 1316-1320 above the issues to be fixed (1312) and the issues that have been fixed (1314). These tabs 1316-1320 represent different roles associated for a website so that different users (e.g., editor, webmaster, developer) can readily view only the issues that pertain to their role.

Referring to FIG. 13B, an example user interface 1350 is depicted showing the accessibility score breakdown 1352 for a site, similar to the interface depicted in FIGS. 11B and 12B, as well as scores 1354 for those components of the accessibility score 1006.

FIG. 14A is an example system 1400 for determining and providing website scores. The example system 1400 includes a website scoring system 1402, one or more website server systems 1404, client computing devices 1406, and one or more communication networks 1408. The example system 1400 can be used to perform the scoring and website evaluation techniques described above and throughout this document, and to provide the user interfaces described above and throughout this document.

The website scoring system 1402 and the website server system 1404 can be any of a variety of appropriate computer server systems, such as cloud-based server systems, distributed computing systems, virtual server systems, and/or other computer systems and/or collections of computing devices. The network 1408 can be any of a variety of appropriate communication networks, such as the internet, wired networks, wireless networks, mobile data networks, local area networks (LANs), wide area networks (WANs), virtual private networks (VPNs), and/or combinations thereof. The client computing devices 1406 can any of a variety of appropriate client computing devices, such as mobile computing devices (e.g., smartphones, tablet computing devices, wearable computing devices), laptop computers, desktop computers, and/or other computing devices.

The website server system 1404 can host one or more websites, which are composed of website code 1416 that is processed and/or served to requesting computing devices. The website code 1416 can include code that may be executed/interpreted by the website server system 1404 to dynamically generate different code that is transmitted to the requesting device. The website code 1416 can additionally include code that is transmitted to the requesting device for interpretation and/or processing by the requesting device to render the website that is hosted by the website server system 1404. The website server system 1404 is a simplified representation of the infrastructure to provide a website on client devices, which may have include statements (and/or other statements) that cause a requesting device to obtain code from multiple different website server systems that are used to present and render a website on a client device (e.g., include statements for libraries and/or other code repositories hosted on other server systems).

The website scoring system 1402 can crawl a website (or sub-parts thereof, such as a single webpage or collection of webpages) hosted by the website server system 1404 to obtain the code for the website via the network 1408. The website scoring system 1402 can interpret and render the code for the website, which can include obtaining code from other website server systems (as directed by include and other statements in the code) and/or dynamically executing/interpreting code that is provided for client-side interpretation/execution (e.g., running scripts that are provided for client-side execution). With the rendered website, the website scoring system can access scoring techniques (1414) to determine scores for the website score (e.g., DCI score) and can access weights (1414) for weighting and combining those scores. The techniques and weights (1414) may be the same across all websites, and/or there may be multiple different techniques and weights that are selected for the particular website based on, for example, the content vertical or other classification for the website, and/or based on specific website owner requests. Different weighting and different scoring techniques may be available by the website scoring system 1402. The website scoring system 1402 can store the website code 1412 that is obtained along with a corresponding timestamp, as well as the scores 1410 that are generated. By storing the website code 1412 at a particular time and with its corresponding scores, the website scoring system 1402 can provide historical information on the quality of the website and the basis for those quality determinations, which may be valuable in assessing whether the website is improving and/or whether to revert back to earlier versions/features in the website.

The website scoring system 1402 can, itself, host a website and/or web content that is provided to the client computing devices 1406 via the network 1408. For example, the website scoring system 1402 can serve the websites to provide the user interfaces (described above) on the client devices 1406, which may be presented in web browsers, mobile apps, and/or other appropriate applications on the devices 1406. In some instances, the website scoring system 1402 can provide an API to provide website scoring information that can be accessed and used as part of other website systems.

FIG. 14B is an illustrative example 1450 of the website scoring system 1402 generating website scores. In the depicted example, there are scoring techniques and weightings for SEO 1452, Accessibility 1454, and QA 1456. These scoring techniques and weightings can be part of the scoring and weighting techniques 1414 that are used by the website scoring system 1402. An example of the QA 1456 scoring and weighting technique is depicted (1464), which includes a hierarchy of sub-scores and their respective weightings. The nested hierarchy can represent the components that are used to generate each sub-score.

For example, the "misspellings" sub-score can be generated by three component scores, which include (1) a percentage of total words on a website that are not misspellings (percentage of words spelled correctly), (2) a percentage of the website's pages with no misspellings (percentage of pages that do not include any spelling errors), and (3) Boolean value as to whether the homepage is free of misspellings (1 or true value if no misspellings, 0 or false if there are misspellings on the homepage of the website). The scores for (1) and (2) are a float value that corresponds to the percentage, and the score for (3) is a 0 or 1 based on whether that condition is true. Each of these sub-scores (1)-(3) are weighted according to the corresponding weights (weight of 0.3 for (1), 0.3 for (2), and 0.4 for (3)) and the combined using those weights to generate the misspellings sub-score. The misspellings sub-scores is similarly weighted (weight of 0.65) and combined with other scores that that level (e.g., potential misspellings sub-score) to generate the content quality sub-score. The content quality sub-score is also weighted (weight of 0.35) and combined with other scores at that level (e.g., freshness score) to generate the QA score.

The DCI service (web scoring service) 1458 uses these scoring techniques and weightings to generate scores 1460 for a website, which can be stored in the scores 1410 repository and served to the client devices 1406. Example scores and sub-scores for the components of the QA score for a website are depicted (1462).

FIGS. 15A-B are example techniques 1500, 1550 for generating and transmitting website scores. The example techniques can be performed by any of a variety of appropriate computing devices, such as the website scoring system 1402.

Referring to FIG. 15A, the example technique 1500 determines a score for a website, such as a DCI score, which can then be used to assess and improve the website, and can be transmitted to client devices. As part of the technique 1500, a website is identified (1502), which causes the web server to crawl and retrieve the webpages that are make up the website (1504). Identification can include, for example, a website owner signing up or enrolling their website in the website scoring system, and/or the website being identified as being part of a particular industry and/or content vertical. Retrieval can include, for example, crawling links on webpages (starting with a homepage or other appropriate starting page) to retrieve the entirety of the website. In some instances, retrieval can involve retrieving only one webpage and/or a collection of webpages (fewer than all) for a website.

Using the retrieved webpages, determination of the component scores for an SEO score can be performed (1506). Components of the SEO score are described above with regard to FIGS. 3-7 and 11A-C, as well as below with regard to FIGS. 17A-D. Starting at the lowest level, each component score can be a numerical value that is determined as either a floating value based on a percentage or other proportion of content that satisfies a particular value (e.g., percentage of pages with particular condition, percentage of words with a particular condition, proportion of links that satisfy a particular condition) or as a Boolean value based on a particular condition being satisfied (e.g., homepage has particular condition, greater than 5 instances of a particular condition on level 1 pages). Once these lowest level component scores are generated from the website code, they can be combined according to the weighting and hierarchy of scores to generate other component scores.

Using these component scores, SEO fixes, corresponding points that can be gained by implementing the fixes, and corresponding difficulty values for the fixes can be identified (1508). For example, the fixes can be identified as the instances on the website that triggered one or more conditions resulting in a less than perfect component score to be generated/allocated to the website. The fixes can be pegged to particular webpages on the website and particular portions of those websites, and can be identified using links to those webpages and to the particular elements within those webpages (e.g., DOM element identification of problematic feature). Points that are being lost by those problems—and that can be added to the overall score by implementing the fixes—can be generated, as well as corresponding difficultly levels for the fixes. The points that would be gained can be determined, for example, by processing the lost value from the sub-score through the hierarchy of weights and score combinations to determine a total impact on the SEO score and, as a result, the impact on the overall DCI score. The difficulty can be determined, for example, based on the type of fix and the number of instances of that fix that are required. For example, if there is only one instance of an easy to resolve problem (e.g., misspelling), it can receive a low difficultly value. In contrast, if there are 10,000 instances of that different misspellings that need to be corrected, that can be a much more difficult problem to resolve. Likewise, a fix that is more difficult to implement (e.g., changing website layout and/or menu structure), may receive a higher difficulty value even if it there is a smaller instance of the problem.

The SEO scores can be generated from its component scores (1510), as described throughout this document by combining the SEO component scores according to their weighting.

The Accessibility component scores, fixes, corresponding points gained, difficulty, and overall Accessibility score can be determined (1512-1516) in a similar manner as described above with regard to the SEO scores. The QA component scores, fixes, corresponding points gained, difficulty, and overall QA score can also be determined (1518-1522) in a similar manner as described above with regard to the SEO scores.

The SEO, Accessibility, and QA scores can be combined and used to determine the overall website quality score (1524). For example, these scores can be weighted and combined, as described above with regard to FIGS. 2, 8, 9, and 10A-B. All of these scores, including the score components, fixes, points gained, and/or difficultly can be stored (1526) and, when requested, transmitted for presentation in a user interface (1528), such as the user interfaces described above with regard to FIGS. 10-13.

Referring to FIG. 15B, the example technique 1550 generates analytics based on website scores from multiple different websites. The first portion of the technique 1550 is to generate an index that ranks the websites (1552-1560), which can be stored and transmitted in a report. The second portion of the technique 1550 is to generate models that correlate particular website code to higher levels of quality based on website scores (1562-1568), which can then be used to suggest website improvements and fixes to website owners who have low rankings/scores. The first portion and the second portion of the technique 1550 can be performed together and/or separately.

As part of the first portion of the technique 1550, website scores and their component scores are accessed (1552) and compared (1554), which permits the websites to be ranked against each other along one or more parameters (1556), such as the overall score, particular component scores, and/or combinations thereof. The rankings can be used to generate a report (1558), which can be stored and transmitted to client computing devices upon request (1560).

The second portion of the technique 1550 can use these rankings among websites to perform machine learning. For example, the scores for a group of websites along with the corresponding website code upon which the scores are based can be fed into one or more machine learning algorithms, such as neural networks, clustering, regression algorithms, unsupervised learning algorithms, supervised learning algorithms, and/or other appropriate machine learning algorithms. The machine learning algorithms can be used to generate quality models based on the correlation of particular website features to higher and lower scores (1564). For example, a correlation between a particular type of menu structure and higher website scores (and/or component scores) may be identified from the machine learning algorithm, and a correlation between another type of menu structure and lower website scores (and/or component scores) may also be identified. These correlations between website code features and website scores can be included in the quality models that are generated. The quality models can be stored (1566) and subsequently used to generate suggested fixes to website owners (and/or other users) (1568).

FIG. 16 and FIGS. 17A-D are diagrams of example scoring hierarchies and example weightings to generate QA scores (FIG. 16) and component scores for an SEO score (FIGS. 17A-D). These hierarchies depict base level component scores that are generated from analysis of the website code itself, as well as second level and higher component scores that are generated by combining weighted base level component scores according to a determined weightings. The hierarchy and the weightings that are depicted are illustrative examples. Other hierarchies and weightings are also possible. The example hierarchies and weightings can be stored as part of the scoring techniques and weights 1414 that are used by the website scoring system 1402, and can be used as part of the technique 1500 for scoring websites.

The based level component scores that are generated can be a float value (e.g., value between 0.0 and 1.0) and/or Boolean value (e.g., value of 0 or 1) depending on the component score that is being determined. In the examples that are depicted, component scores that call for a percentage or number of instances of a condition on the website (e.g., % of total that are not broken, Lvl 1 pages with >=1 broken link) are float values that correspond to the percentage and/or number of instances (normalized number of instances, percentage of instances). Component scores that call for a condition to be satisfied can be Boolean values (e.g., 1 or more pages first detected within last 30 days, 0 unsafe domains). These values can be determined by evaluating the website code across the webpages for the website. In some instances, a single webpage and/or collection of webpages on a website can be evaluated.

Although not depicted, a hierarchy of component scores and weightings for generating an Accessibility can also be generated and used.

FIG. 18 is a block diagram of example computing devices 1800, 1850 that may be used to implement the systems and methods described in this document, as either a client or as a server or plurality of servers. Computing device 1800 is intended to represent various forms of digital computers, such as laptops, desktops, workstations, personal digital assistants, servers, blade servers, mainframes, and other appropriate computers. Computing device 1800 is further intended to represent any other typically non-mobile devices, such as televisions or other electronic devices with one or more processors embedded therein or attached thereto. Computing device 1850 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 1800 includes a processor 1802, memory 1804, a storage device 1806, a high-speed controller 1808 connecting to memory 1804 and high-speed expansion ports 1810, and a low-speed controller 1812 connecting to low-speed bus 1814 and storage device 1806. Each of the components 1802, 1804, 1806, 1808, 1810, and 1812, are interconnected using various buses, and may be mounted on a common motherboard or in other manners as appropriate. The processor 1802 can process instructions for execution within the computing device 1800, including instructions stored in the memory 1804 or on the storage device 1806 to display graphical information for a GUI on an external input/output device, such as display 1816 coupled to high-speed controller 1808. In other implementations, multiple processors and/or multiple buses may be used, as appropriate, along with multiple memories and types of memory. Also, multiple computing devices 1800 may be connected, with each device providing portions of the necessary operations (e.g., as a server bank, a group of blade servers, or a multi-processor system).

The memory 1804 stores information within the computing device 1800. In one implementation, the memory 1804 is a computer-readable medium. In one implementation, the memory 1804 is a volatile memory unit or units. In another implementation, the memory 1804 is a non-volatile memory unit or units.

The storage device 1806 is capable of providing mass storage for the computing device 1800. In one implementation, the storage device 1806 is a computer-readable medium. In various different implementations, the storage device 1806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1804, the storage device 1806, or memory on processor 1802.

The high-speed controller 1808 manages bandwidth-intensive operations for the computing device 1800, while the low-speed controller 1812 manages lower bandwidth-intensive operations. Such allocation of duties is an example only. In one implementation, the high-speed controller 1808 is coupled to memory 1804, display 1816 (e.g., through a graphics processor or accelerator), and to high-speed expansion ports 1810, which may accept various expansion cards (not shown). In the implementation, low-speed controller 1812 is coupled to storage device 1806 and low-speed bus 1814. The low-speed bus 1814 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 1800 may be implemented in a number of different forms and/or virtualized, as shown in the figure. For example, it may be implemented as a standard server 1820, or multiple times in a group of such servers. It may also be implemented as part of a rack server system 1824. In addition, it may be implemented in a personal computer such as a laptop computer 1822. Alternatively, components from computing device 1800 may be combined with other components in a mobile device (not shown), such as computing device 1850. Each of such devices may contain one or more of computing devices 1800, 1850, and an entire system may be made up of multiple computing devices 1800, 1850 communicating with each other.

Computing device 1850 includes a processor 1852, memory 1864, an input/output device such as a display 1854, a communication interface 1866, and a transceiver 1868, among other components. The computing device 1850 may also be provided with a storage device, such as a micro-drive or other device, to provide additional storage. Each of the components 1850, 1852, 1864, 1854, 1866, and 1868, are interconnected using various buses, and several of the components may be mounted on a common motherboard or in other manners as appropriate.

The processor 1852 can process instructions for execution within the computing device 1850, including instructions stored in the memory 1864. The processor may also include separate analog and digital processors. The processor may provide, for example, for coordination of the other components of the computing device 1850, such as control of user interfaces, applications run by computing device 1850, and wireless communication by computing device 1850.

Processor 1852 may communicate with a user through control interface 1858 and display interface 1856 coupled to a display 1854. The display 1854 may be, for example, a TFT LCD display or an OLED display, or other appropriate display technology. The display interface 1856 may comprise appropriate circuitry for driving the display 1854 to present graphical and other information to a user. The control interface 1858 may receive commands from a user and convert them for submission to the processor 1852. In addition, an external interface 1862 may be provided in communication with processor 1852, so as to enable near area communication of computing device 1850 with other devices. External interface 1862 may provide, for example, for wired communication (e.g., via a docking procedure) or for wireless communication (e.g., via Bluetooth® or other such technologies).

The memory 1864 stores information within the computing device 1850. In one implementation, the memory 1864 is a computer-readable medium. In one implementation, the memory 1864 is a volatile memory unit or units. In another implementation, the memory 1864 is a non-volatile memory unit or units. Expansion memory 1874 may also be provided and connected to computing device 1850 through expansion interface 1872, which may include, for example, a subscriber identification module (SIM) card interface. Such expansion memory 1874 may provide extra storage space for computing device 1850, or may also store applications or other information for computing device 1850. Specifically, expansion memory 1874 may include instructions to carry out or supplement the processes described above, and may include secure information also. Thus, for example, expansion memory 1874 may be provided as a security module for computing device 1850, and may be programmed with instructions that permit secure use of computing device 1850. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1864, expansion memory 1874, or memory on processor 1852.

Computing device 1850 may communicate wirelessly through communication interface 1866, which may include digital signal processing circuitry where necessary. Communication interface 1866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 1868 (e.g., a radio-frequency transceiver). In addition, short-range communication may occur, such as using a Bluetooth®, WiFi, or other such transceiver (not shown). In addition, GPS receiver module 1870 may provide additional wireless data to computing device 1850, which may be used as appropriate by applications running on computing device 1850.

Computing device 1850 may also communicate audibly using audio codec 1860, which may receive spoken information from a user and convert it to usable digital information. Audio codec 1860 may likewise generate audible sound for a user, such as through a speaker, e.g., in a handset of computing device 1850. Such sound may include sound from voice telephone calls, may include recorded sound (e.g., voice messages, music files, etc.) and may also include sound generated by applications operating on computing device 1850.

The computing device 1850 may be implemented in a number of different forms, as shown in the figure. For example, it may be implemented as a cellular telephone 1880. It may also be implemented as part of a smartphone 1882, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for analyzing web site content and recommending changes in web site content, comprising:
    receiving, by a computer system and from a client device, a request for analysis of a web site;
    analyzing, by the computer system, content of the website;
    determining, by the computer system, a score that indicates a quality of the website based on the analyzing the content of the website, the score being determined to have a less-than-perfect value from among potential values for the score;
    determining, by the computer system, a first feature of the website that resulted in the score being determined to have the less-than-perfect value;
    determining, by the computer system, a second feature of the website that resulted in the score being determined to have the less-than-perfect value; and
    transmitting, by the computer system to the client device, information to cause the client device to present a single user interface screen that identifies multiple different features of the website able to be changed to increase the score, including the first feature and the second feature, the single user interface screen concurrently presenting:
        a textual representation of the score,
        a non-textual graphical representation of the score that is distinct from the textual representation of the score,
        a graph that indicates a history of the score changing over time, wherein the graph is distinct from the textual representation of the score and is distinct from the non-textual graphical representation of the score,
        first text that indicates the first feature of the website that resulted in the score being determined to have the less-than-perfect value, and
        second text that indicates the second feature of the website that resulted in the score being determined to have the less-than-perfect value.

2. The method of claim 1, wherein the non-textual graphical representation of the score comprises a circle that includes a first portion of the circle presented in a first color and a second portion of the circle presented in a second color, a proportion of the circle that is presented in the first color with respect to an entire amount of the circle representing a proportion of the score with respect to a perfect score.

3. The method of claim 1, wherein the single user interface screen further concurrently presents the textual representation of the score within the circle.

4. The method of claim 1, wherein the graph includes:
a presentation of multiple dates on an x-axis of the graph; and
a presentation of scores between 0 and 100 on a y-axis of the graph.

5. The method of claim 1, wherein the single user interface screen further concurrently presents:
a first line that indicates a value of a first metric that affects the score, the first line having a first length;
a second line that indicates a value of a second metric that affects the score, the second line having a second length that is different from the first length; and
a third line that indicates a value of a third metric that affects the score, the third line having a third length that is different from the first length and the second length.

6. The method of claim 5, wherein:
the first line is accompanied by a first number that indicates the value of the first metric;
the second line is accompanied by a second number that indicates the value of the second metric;
the third line is accompanied by a third number that indicates the value of the third metric.

7. A computer-implemented method for analyzing website content and recommending changes in website content, comprising:
sending, by a client device and to a computer system, a request for analysis of a website to cause the computer system to:
identify an analysis of content of the website,
determine a score that indicates a quality of the website based on the analysis of the content of the website, the score being determined to have a less-than-perfect value from among potential values for the score,
determine a first feature of the website that resulted in the score being determined to have the less-than-perfect value,
determine a second feature of the website that resulted in the score being determined to have the less-than-perfect value, and
transmit, to the client device, information that is responsive to the request for analysis of the website; and
receiving, by the client device, the information that is responsive to the request for analysis of the website, the information causing the client device to present a single user interface screen that identifies multiple different features of the website able to be changed to increase the score, including the first feature and the second feature, the single user interface screen concurrently presenting:
a textual representation of the score,
a non-textual graphical representation of the score that is distinct from the textual representation of the score,
a graph that indicates a history of the score changing over time, wherein the graph is distinct from the textual representation of the score and is distinct from the non-textual graphical representation of the score,
first text that indicates the first feature of the website that resulted in the score being determined to have the less-than-perfect value, and
second text that indicates the second feature of the website that resulted in the score being determined to have the less-than-perfect value.

8. The method of claim 7, wherein:
the non-textual graphical representation of the score comprises a circle that includes a first portion of the circle presented in a first color and a second portion of the circle presented in a second color, a proportion of the circle that is presented in the first color with respect to an entire amount of the circle representing a proportion of the score with respect to a perfect score; and
the single user interface screen further concurrently presents the textual representation of the score within the circle.

9. The method of claim 7, wherein the graph includes:
a presentation of multiple dates on an x-axis of the graph; and
a presentation of scores between 0 and 100 on a y-axis of the graph.

10. The method of claim 7, wherein the single user interface screen further concurrently presents:
a first line that indicates a value of a first metric that affects the score, the first line having a first length, the first line being accompanied by a first number that indicates the value of the first metric;
a second line that indicates a value of a second metric that affects the score, the second line having a second length that is different from the first length, the second line being accompanied by a second number that indicates the value of the second metric; and
a third line that indicates a value of a third metric that affects the score, the third line having a third length that is different from the first length and the second length, the third line being accompanied by a third number that indicates the value of the third metric.

11. A computer-implemented method for analyzing website content and recommending changes in website content, comprising:
receiving, by a computer system and from a client device, a request for analysis of a web site;
analyzing, by the computer system, content of the website;
determining, by the computer system, a score that indicates a quality of the website based on the analyzing content of the website, the score being determined to have a less-than-perfect value from among potential values for the score;
determining, by the computer system, a first feature of the website that resulted in the score being determined to have the less-than-perfect value;
determining, by the computer system, a second feature of the website that resulted in the score being determined to have the less-than-perfect value, the first feature and the second feature being two of multiple different features of the website that resulted in the score being determined to have the less-than-perfect value;
identifying, by the computer system, a first subset of the multiple different features that pertain to an editor type of user role;
identifying, by the computer system, a second subset of the multiple different features that pertain to a developer type of user role; and
transmitting, by the computer system to the client device, information to cause the client device to present a single user interface screen that identifies the multiple different features of the website, including the first feature and the second feature, the single user interface screen concurrently presenting:
   first text that indicates the first feature of the website that resulted in the score being determined to have the less-than-perfect value,
   second text that indicates the second feature of the website that resulted in the score being determined to have the less-than-perfect value,
   a first graphical element that is user selectable to cause the client device to change from presenting text that indicates all of the multiple different features to presenting only text that indicates the first subset of the multiple different features that pertain to the editor type of user role, and
   a second graphical element that is user selectable to cause the client device to change from presenting text that indicates all of the multiple different features to presenting only text that indicates the second subset of the multiple different features that pertain to the developer type of user role.

12. The method of claim 11, wherein:
the first graphical element comprises a first selectable tab of a plurality of selectable tabs; and
the second graphical element comprises a second selectable tab of the plurality of selectable tabs.

13. The method of claim 11, further comprising:
determining, by the computer system, a first importance of a change to the first feature of the web site; and
determining, by the computer system, a second importance of a change to the second feature of the website,
wherein the single user interface screen further concurrently presents:
   an indication of the first importance of the change to the first feature of the web site, and
   an indication of the second importance of the change to the second feature of the web site.

14. The method of claim 13, wherein:
the indication of the first importance of the change to the first feature of the website presented by the single user interface screen comprises a first user interface element that includes an exclamation mark;
the indication of the second importance of the change to the second feature of the website presented by the single user interface screen comprises a second user interface element that includes an exclamation mark; and
the first user interface element that includes the exclamation mark has a first color that is different from a second color of the second user interface element that includes the exclamation mark to indicate a relative importance of the change to the first feature of the website with respect to the change to the second feature of the website.

15. The method of claim 13, wherein:
the single user interface screen further includes a table that lists the multiple different features of the website that resulted in the score being determined to have the less-than-perfect value;
a first row of the table includes:
   (i) the first text that indicates the first feature of the web site, and
   (ii) the indication of the first importance of the change to the first feature of the web site; and
a second row of the table includes:
   (i) the second text that indicates the second feature of the website, and
   (ii) the indication of the second importance of the change to the second feature of the web site.

16. The method of claim 11, wherein the single user interface screen further concurrently presents:
   a textual representation of the score; and
   a non-textual graphical representation of the score that is distinct from the textual representation of the score.

17. The method of claim 16, wherein:
the non-textual graphical representation of the score comprises a circle that includes a first portion of the circle presented in a first color and a second portion of the circle presented in a second color, a proportion of the circle that is presented in the first color with respect to an entire amount of the circle representing a proportion of the score with respect to a perfect score; and
the single user interface screen further concurrently presents the textual representation of the score within the circle.

18. A computer-implemented method for analyzing website content and recommending changes in website content, comprising:
sending, by a client device and to a computer system, a request for analysis of a website to cause the computer system to:
   identify an analysis of content of the website,
   determine a score that indicates a quality of the website based on the analysis of the content of the website, the score being determined to have a less-than-perfect value from among potential values for the score,
   determine a first feature of the website that resulted in the score being determined to have the less-than-perfect value,
   determine a second feature of the website that resulted in the score being determined to have the less-than-perfect value, the first feature and the second feature being two of multiple different features of the website that resulted in the score being determined to have the less-than-perfect value,
   identify, by the computer system, a first subset of the multiple different features that pertain to an editor type of user role,
   identify, by the computer system, a second subset of the multiple different features that pertain to a developer type of user role, and
   transmit, to the client device, information that is responsive to the request for analysis of the website; and
receiving, by the client device, the information that is responsive to the request for analysis of the website, the information causing the client device to present a single user interface screen that identifies the multiple different features of the website, including the first feature and the second feature, the single user interface screen concurrently presenting:
   first text that indicates the first feature of the website that resulted in the score being determined to have the less-than-perfect value,
   second text that indicates the second feature of the website that resulted in the score being determined to have the less-than-perfect value
   a first graphical element that is user selectable to cause the client device to change from presenting text that indicates all of the multiple different features to presenting only text that indicates the first subset of the multiple different features that pertain to the editor type of user role, and a second graphical element that is user selectable to cause the client device to change from presenting text that indicates all of the multiple different features to presenting only text that indicates the second subset of the multiple different features that pertain to the developer type of user role.

19. The method of claim 18, wherein:
the first graphical element comprises a first selectable tab of a plurality of selectable tabs; and
the second graphical element comprises a second selectable tab of the plurality of selectable tabs.

20. The method of claim 18, wherein the single user interface screen further concurrently presents:
an indication of a first importance of a change to the first feature of the website, based on the information that is received by the client device and that is responsive to the request for analysis of the website; and
an indication of a second importance of a change to the second feature of the website, based on the information that is received by the client device and that is responsive to the request for analysis of the website.

21. The method of claim 20, wherein:
the indication of the first importance of the change to the first feature of the website presented by the single user interface screen comprises a first user interface element that includes an exclamation mark;
the indication of the second importance of the change to the second feature of the website presented by the single user interface screen comprises a second user interface element that includes an exclamation mark; and
the first user interface element that includes the exclamation mark has a first color that is different from a second color of the second user interface element that includes the exclamation mark to indicate a relative importance of the change to the first feature of the website with respect to the change to the second feature of the website.

22. The method of claim 20, wherein:
the single user interface screen further includes a table that lists the multiple different features of the website that resulted in the score being determined to have the less-than-perfect value;
a first row of the table includes:
(i) the first text that indicates the first feature of the web site, and
(ii) the indication of the first importance of the change to the first feature of the web site; and
a second row of the table includes:
(i) the second text that indicates the second feature of the website, and
(ii) the indication of the second importance of the change to the second feature of the web site.

23. The method of claim 18, wherein the single user interface screen further concurrently presents:
a textual representation of the score; and
a non-textual graphical representation of the score that is distinct from the textual representation of the score.

24. The method of claim 23, wherein:
the non-textual graphical representation of the score comprises a circle that includes a first portion of the circle presented in a first color and a second portion of the circle presented in a second color, a proportion of the circle that is presented in the first color with respect to an entire amount of the circle representing a proportion of the score with respect to a perfect score; and
the single user interface screen further concurrently presents the textual representation of the score within the circle.

* * * * *